(12) United States Patent
Suzuki et al.

(10) Patent No.: US 7,616,892 B2
(45) Date of Patent: Nov. 10, 2009

(54) DELIVERY METHOD AND DELIVERY SYSTEM OF CONTENTS INFORMATION, AND CENTRAL STATION THEREOF

(75) Inventors: Yasuo Suzuki, Kawasaki (JP); Hiroaki Nakazato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/141,708

(22) Filed: May 31, 2005

(65) Prior Publication Data
US 2005/0259541 A1 Nov. 24, 2005

Related U.S. Application Data

(63) Continuation of application No. PCT/JP03/02482, filed on Mar. 4, 2003.

(51) Int. Cl.
*H04J 14/00* (2006.01)
(52) U.S. Cl. ............................... 398/72; 398/66; 398/67; 398/68; 398/69; 398/70; 398/71
(58) Field of Classification Search ............. 398/66–72, 398/70–71, 79, 48
See application file for complete search history.

(56) References Cited

U.S. PATENT DOCUMENTS

| | | | | |
|---|---|---|---|---|
| 4,760,442 A | * | 7/1988 | O'Connell et al. | ........... 725/119 |
| 4,873,681 A | * | 10/1989 | Arthurs et al. | ................ 398/51 |
| 5,337,175 A | | 8/1994 | Ohnsorge et al. | |
| 5,438,445 A | * | 8/1995 | Nakano | ........................ 398/83 |
| 5,717,795 A | * | 2/1998 | Sharma et al. | ................ 385/24 |
| 5,864,413 A | * | 1/1999 | Feldman et al. | ............... 398/72 |
| 6,198,478 B1 | | 3/2001 | Ota et al. | |
| 6,262,821 B1 | * | 7/2001 | Fevrier et al. | ................ 398/48 |
| 6,323,975 B1 | * | 11/2001 | Kurki | ........................... 398/9 |
| 6,594,049 B1 | | 7/2003 | Brinkman et al. | |
| 6,768,827 B2 | * | 7/2004 | Yoo | ............................. 385/14 |
| 2002/0159117 A1 | * | 10/2002 | Nakajima et al. | ........... 359/127 |

FOREIGN PATENT DOCUMENTS

| | | |
|---|---|---|
| JP | 5-63659 | 3/1993 |
| JP | 11-122598 | 4/1993 |
| JP | 2001-197121 | 7/2001 |

(Continued)

OTHER PUBLICATIONS

Notice of Reason for Refusal dated May 24, 2006.

*Primary Examiner*—Quan-Zhen Wang
(74) *Attorney, Agent, or Firm*—Katten Muchin Rosenman LLP

(57) ABSTRACT

A contents information delivery method for delivering a desired contents information by transmitting an optical signal from a central station to each of a plurality of user stations via a transmission line includes: a first step (S1) of outputting an optical signal containing the contents information as an optical signal having mutually different wavelengths each assigned for the each user station in advance, in the central station; a second step (S2) of transmitting an optical signal having a plurality of wavelengths outputted via the transmission line in the first step; and a third step (S3), in which each user station receives the optical signal having the wavelength assigned from among the transmitted optical signals, whereby this simple configuration does not limit the transmission rate, the coding format, or the like in an optical access system, i.e., making it possible to cope with a super-large capacity.

17 Claims, 18 Drawing Sheets

FOREIGN PATENT DOCUMENTS

| JP | 2001-217840 | 8/2001 |
| JP | 2001-358697 | 12/2001 |
| JP | 2002-77107 | 3/2002 |
| JP | 2002-271357 | 9/2002 |
| JP | 2002-290378 | 10/2002 |

* cited by examiner

FIG. 18

|  | MP3 MUSIC | STANDARD QUALITY PICTURE | HIGH DEFINITION PICTURE |
|---|---|---|---|
| STREAM DELIVERY (DELIVER FROM SERVER IN REAL TIME) | 80~130Kb/s | 3~10Mb/s | 20Mb/s |
| BLOCK DELIVERY (FOR USE AFTER DELIVERING CONTENTS AT ONE TIME AND STORING INTO TERMINAL) | 130Kb/s | 220Mb/s | 800Mb/s |

DELIVERY METHOD AND DELIVERY SYSTEM OF CONTENTS INFORMATION, AND CENTRAL STATION THEREOF

CROSS-REFERENCE TO RELATED APPLICATION

This application is a continuation of International Application PCT/JP2003/002482 filed on Mar. 4, 2003, pending at the time of filing this continuation application, the contents of which are herein wholly incorporated by reference.

BACKGROUND OF THE INVENTION (1) Field of the Invention

The present invention relates to a delivery method and distribution system of a contents information as well as a central station thereof suitable for use in providing a service for carrying out a contents delivery with an optical access system.

It is anticipated that a large-capacity contents delivery service such as Super High Definition (SHD) pictures becomes popular by means of a FTTH (Fiber to The Home) or the like in near future. For this reason, there will be a need for communication common carriers or the like to receive contents as an optical signal from contents suppliers, and deliver the optical signal as it is to each user from a delivery central station or the like.

(2) Description of the Related Art

As for the conventional contents collection and delivery service, the one using an electrical signal as the information-transmission medium is mainstream. There is also the one using an optical signal as the information-transmission medium in a part of a CATV system, for example, on optical transmission lines such as a HFC (Hybrid Fiber Coax). However also in this case a delivery section to each user is processed with electrical signals. Moreover, as a part of this optical transmission line, the delivery by an optical fiber and a PON (Passive Optical Network) is used.

In addition, a BPON (broadband PON), an STM-PON (Synchronous Transfer Mode PON), an ATM-PON (Asynchronous Transfer Mode PON), an EPON (Ethernet PON), or the like can be used as the above-described PON. Moreover, as a network for the contents delivery, there is also a delivery system including a router, a LAN switch, a media converter, or the like. In the above-described BPON, a Dynamic Bandwidth Assignment (DBA) technique is under investigation, however, this technique is used within the scope of the transmission capacity intrinsic to the transmission line.

However, in any one of such conventional techniques for the contents delivery, a light wavelength, a transmission rate, and a coding format of signals are limited in each system (fixed to some extent), and thus the upper limit of the user service is generally 100 Mb/s or so.

Namely, in networks for a backbone system (a trunk network system), a wavelength routing by means of a DC-SW (Delivery and Coupling Switch), a MEMS (Micro Electro Mechanical Systems) switch, or the like is under Investigation as a large-scale photonic MPLS (Multi Protocol Label Switching) router, however, assuming development of the contents delivery service in future, it is essential to develop a network system for the contents delivery (corresponding to a super-large capacity), which limits neither the transmission rate nor the coding format, also in an access system.

Moreover, a relation between a download time of the contents to be delivered and the transmission rate in future optical access systems is generally assumed as shown in FIG. 18. As shown in FIG. 18, in a stream delivery having a method of delivering from a server on real time, if the download time is set to 3 minutes, it is assumed that the transmission rate of 80-130 Kb/s or so for MP3 music, 3-10 Mb/s or so for a standard image-quality picture, and 20 Mb/s or so for a high definition picture are required respectively.

Moreover, as shown in FIG. 18, in a block delivery having a method of using contents after delivering contents at one time and storing into a terminal, if the download time is set to 3 minutes, it is assumed that the transmission rate of 80-130 Kb/s or so for MP3 music, 220 Mb/s or so for a standard image-quality picture, and 800 Mb/s or so for a high definition picture are required respectively.

In this way, it is thought that if the same download time is required for the stream delivery and the block delivery, there will be produced a difference in the required bandwidths in these methods, which causes the network configurations thereof to differ. However, whichever is chosen from the delivery methods of which the required bandwidths are greatly different, getting through with a common (or unique) network configuration will be a subject in order to make the network configuration efficient.

In addition, as a technique related to the present invention there are the techniques described in Japanese Patent (Kokai) Hei 5-63659 (patent document 1) and Japanese Patent Publication No. 3169665 (patent document 2). Such techniques assume a multiple star network in which transmission to each subscriber is carried out using signals having a common wavelength band, so it is impossible to realize, from the techniques described in the above-described documents, the very network having such a simple configuration that each subscriber can receive a delivery of a large-capacity contents information on demand.

The present invention has been made in view of such a problem, and is intended to provide a delivery method and delivery system of a contents information as well as a central station thereof, which do not restrict the transmission rate, the coding format, or the like in the access system, i.e., which is enabled to cope with a super-large capacity by means of a simple configuration, and also which is enabled to cope with delivery methods of which the required bandwidths are greatly different.

[patent document 1] Japanese Patent Laid-open (Kokai) Hei 5-63659

[patent document 2] Japanese Patent No. 3169665

SUMMARY OF THE INVENTION

In order to attain the above-described objective, the contents information delivery method of the present invention, which is an information delivery method of delivering a desired contents information by transmitting an optical signal from a central station to each of a plurality of user stations via a transmission line, includes: a first step of outputting the optical signal containing said contents information as an optical signal having mutually different wavelengths each assigned for the user station in advance, in the central station; a second step of transmitting the optical signal having a plurality of wavelengths outputted in said first step via said transmission line; and a third step in which each of the user stations receives the optical signal having the wavelength assigned from among said transmitted optical signals.

Here, the second step may includes: a wavelength-multiplexing step of wavelength-multiplexing, in the central station, the optical signal having a plurality of wavelengths outputted in said first step and transmitting it as a multiplexed optical signal, in which said contents information is multiplexed, via said transmission line; and a wavelength-separating step of wavelength-separating said multiplexed optical signal in a local equipment on said transmission line.

Moreover, it is also possible that in the wavelength-multiplexing step, said multiplexed optical signal is transmitted via a first optical fiber constituting the transmission line, and in said wavelength-separating step, the local equipment wavelength-separates the wavelength-multiplexed optical signal from the first optical fiber, and also outputs said wavelength-separated optical signal to a second optical fiber leading to a user station to which the wavelength of the optical signal is assigned.

Moreover, the first step may includes: a contents receiving step in which the central station receives a contents information to be distributed to each user station as an optical signal from the outside; and a wavelength converting step of converting said received optical signal having the contents information into an optical signal having mutually different wavelengths each assigned for the user station in advance and of outputting it.

In this case, preferably, in the wavelength converting step, a semiconductor optical amplifier, into which the optical signal forming said contents information which is received in the contents receiving step, and light having a wavelength assigned for the each user station which is emitted in a luminescence medium are inputted, converts them into an optical signal having the wavelength for the each user station by a mutual gain modulation effect.

Moreover, in the wavelength separating step, said multiplexed optical signal may be wavelength-separated in a passive element in the local equipment, and furthermore in the wavelength separating step, said multiplexed optical signal may be wavelength-separated in an array waveguide grid as the passive element in said local equipment.

Furthermore, it is also possible that the contents information delivery method includes a control information transmitting step of transmitting a control information for delivering said contents information from each user station to the central station, and in the first step, said central station outputs the optical signal containing said contents information in a wavelength assigned for each user station, based on the control information from the user station.

Moreover, it is also possible that the contents information delivery method includes: a control information outputting step in which each user station outputs a control information for delivering said contents information as an optical signal having a wavelength, which differs for each user station and also differs from the wavelength assigned for the contents information delivery to each user station, via said second optical fiber to a local equipment; and a control information multiplexing step of wavelength-multiplexing the control information inputted from each user station via the second optical fiber in the local equipment, and of transmitting it to the central station via a third optical fiber different from said first optical fiber and second optical fiber, and in the first step, said central station outputs the optical signal containing said contents information in a wavelength assigned to each user station, based on the control information from the local equipment.

Moreover, it is also possible that the contents information delivery method includes: a control information outputting step in which each user station outputs a control information for delivering of said contents information as an optical signal having the wavelength, which differs for each user station and also differs from the wavelength assigned for the contents information delivery to each user station, via the second optical fiber; and a control information multiplexing step of wavelength-multiplexing the control information inputted from each user station via the second optical fiber in the local equipment, and of transmitting it via the first optical fiber, and in the first step, said central station outputs the optical signal containing said contents information in a wavelength assigned to each user station, based on the control information from the local equipment.

Moreover, in the control information transmitting step, each user station can output the control information for delivering said contents information to the server via other existing lines. In this case, the control information may be a contents-selection information which the user station desires to receive.

Furthermore, in the first step, interruption/non-interruption may be controlled of outputting of the optical signal to which said wavelength is assigned.

Moreover, the contents information delivery method of the present invention, which is a contents information delivery method of delivering a desired contents information by transmitting an optical signal from a central station to a user station via a transmission line, includes: a first step of outputting the optical signal as an optical signal having mutually different wavelengths each assigned for the contents information in advance, in the central station; a second step of wavelength-multiplexing the optical signal outputted in said first step and transmitting it via said transmission line; and a third step in which the user station receives after wavelength-separating said wavelength-multiplexed optical signal.

Moreover, the contents information delivery system of the present invention is a contents information delivery system for delivering a contents information by transmitting an optical signal from a central station to a plurality of user stations via a transmission line, said central station includes: an optical signal outputting section which outputs an optical signal containing said contents information as an optical signal having mutually different wavelengths each assigned for the user station in advance; and a contents information multiplexing section which wavelength-multiplexes the optical signal having a plurality of wavelengths outputted from the optical signal outputting section, and transmits it as a multiplexed optical signal in which said contents information is multiplexed, the contents information delivery system includes a local equipment having a first wavelength separating section which, wavelength-separates the wavelength-multiplexed optical signal, on the transmission line, and each user station includes a receiving section which receives only said assigned optical signal from among the optical signals which are wavelength-separated in the first wavelength separating section in the local equipment.

In this case, the local equipment on the transmission line may be arranged at the user station side remotely from the central station.

Moreover, the central station in the contents information delivery system of the present invention, which is a central station in a contents information delivery system for delivering a contents information by transmitting an optical signal from a central station to a plurality of user stations via a transmission line, includes: an optical signal outputting section which outputs the optical signal for each local station, which becomes a delivery of said contents information, as an optical signal having mutually different wavelengths each assigned for the user station in advance; and a wavelength-multiplex-transmitting section which wavelength-multiplexes the optical signal having a plurality of wavelengths from the optical signal outputting section and transmits it.

Thus, according to the present invention, there are effects or advantages as follows.

(1) There is an advantage that by wavelength-multiplex-transmitting the optical signal having mutually different wavelengths each assigned for the user station in advance, a large-capacity signal can be delivered while a delivery node having a simple configuration is employed, thus allowing even the contents delivery of which the required bandwidths differ greatly to be done with a common (one) network configuration.

(2) There is an advantage that serviceability to user stations can be improved because a channel-selection information is transmitted to a central station as a control information from a user station, while in the central station, the contents information can be transmitted based on the control information from the user station.

BRIEF DESCRIPTION OF THE DRAWINGS

Both

Both

Both

FIG. 18 is a view showing a relation between a download time and a transmission rate of the contents to be delivered, which is assumed in the future optical access system.

DESCRIPTION OF THE PREFERRED EMBODIMENTS

Hereinafter, embodiments of the present invention will be described with reference to accompanying drawings.

In addition to the above-mentioned objects of the present invention, other technical problems and means to solve the technical problems and its operational effect will be cleared in the description of the embodiments disclosed below.

(a) Description of a First Embodiment of the Present Invention.

Figure 1:
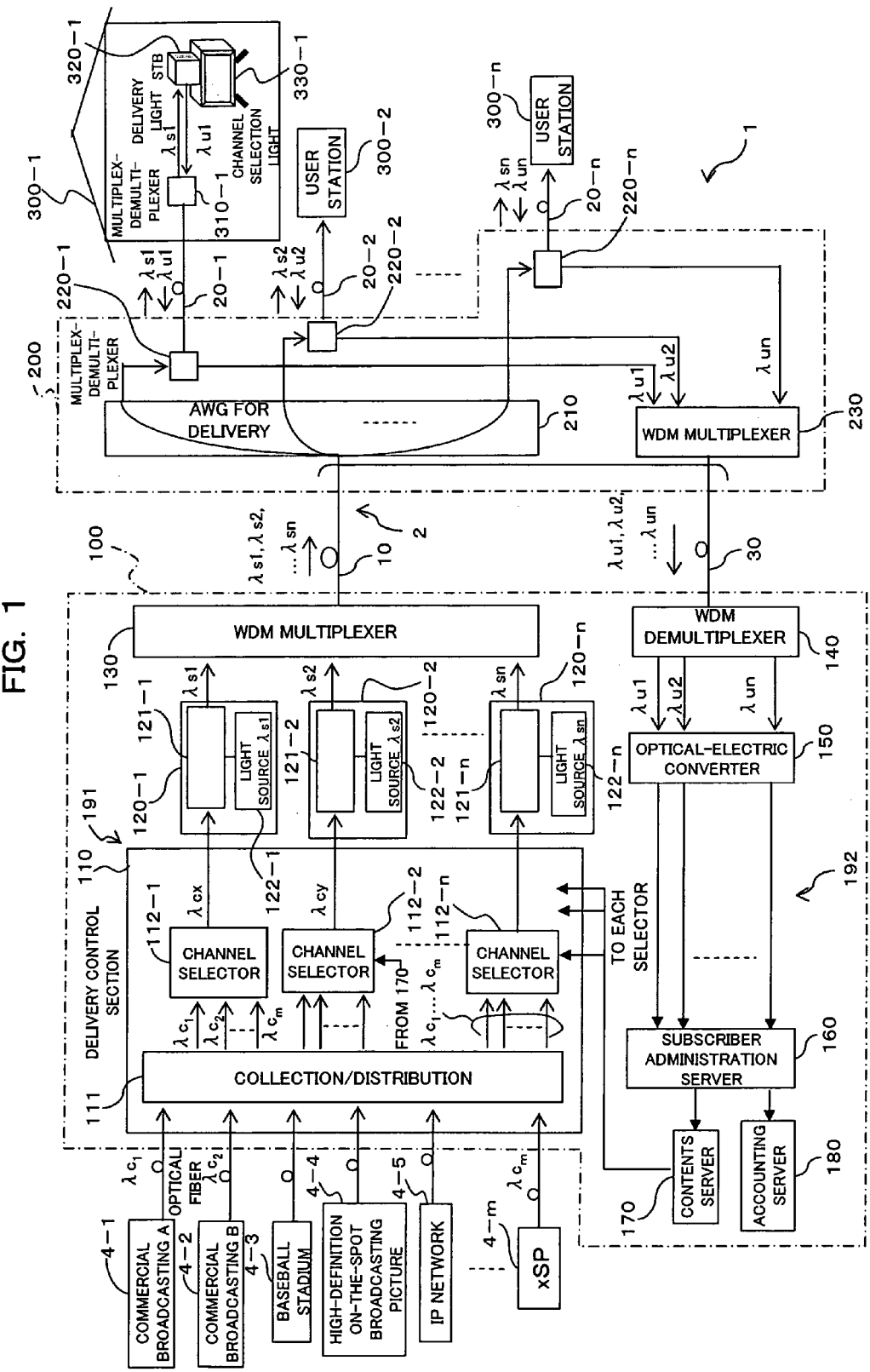
FIG. 1 is a block diagram showing a contents information delivery system concerning a first embodiment of the present invention.

FIG. 1 is a block diagram showing a contents information delivery system concerning a first embodiment of the present invention. A contents information delivery system 1 shown in FIG. 1 is for delivering a contents information by transmitting the optical signal from a central station 100 to a plurality of (for example, n pieces) user stations 300-1 to 300-n via a transmission line 2 being composed of a first optical fiber 10, a local equipment 200 and optical fibers 20-1 to 20-n.

Here, the central station 1 includes: an optical-signal outputting section 191, which outputs the optical signal containing the contents information as an optical signal having mutually different wavelengths $\lambda_{s1}$ to $\lambda_{sn}$ each assigned for each user station 300-1 to 300-n in advance; and a WDM multiplexer 130 as the contents information multiplexing section which wavelength-multiplexes the optical signal having a plurality of wavelengths $\lambda_{s1}$ to $\lambda_{sn}$ from the optical-signal outputting section 191 and transmits it, via the transmission line 2, as a multiplexed optical signal in which contents information is multiplexed, and also includes a server 192 as described later.

Moreover, the above-described optical-signal outputting section 191 includes: a delivery control section 110 which receives from the outside, as an optical signal, the contents information to be delivered to each user station 300-1 to 300-n, and outputs it as an optical signal $\lambda_{ci}$ to each user station 300-1 to 300-n; and wavelength conversion sections 120-1 to 120-n which convert the optical signal $\lambda_{ci}$ from the delivery control section 110 into an optical signal having mutually different wavelengths $\lambda_{s1}$ to $\lambda_{sn}$ each assigned for each user station 300-1 to 300-n in advance.

Here, the delivery control section 110 includes: a collecting/distributing section 111 which receives and collects each contents information from contents information supply sources 4-1 to 4-m via optical fibers that connect to the central station 100, respectively, and also distributes the collected contents information into n sets of parallel optical signals (a parallel optical signal, as a set of m pieces of optical signals including the above-described m kinds of the contents information); and channel selectors 112-1 to 112-n.

Here, each channel selector 112-1 to 112-n outputs selectively any one of the n sets of parallel optical signals distributed in the collecting/distributing section 111 to the user station 300-1 through 300-n, respectively. Specifically, the channel selector 112-1 is adapted to selectively output the optical signal forming the contents information to be delivered to the user station 300-1, and, likewise, the channel selector 112-j is adapted to selectively output the optical signal forming the contents information to be delivered to the user station 300-j (j=2 to n).

Moreover, a wavelength conversion section 120-1 converts the optical signal outputted from the channel selector 112-1 into an optical signal having a wavelength $\lambda_{s1}$ assigned to the user station 300-1, and likewise, the wavelength conversion section 120-j converts the optical signal outputted from the channel selector 112-j into an optical signal having a wavelength $\lambda_{sj}$ assigned to the user station 300-j.

In addition, in the above-described collecting/distributing section 111 is able to collect the contents information from the contents information supply sources 4-1 to 4-m, for example, a picture information of a commercial broadcasting program, a relay picture information on a game from a baseball stadium, a high-definition on-the-spot broadcasting picture and a picture information from an IP (Internet Protocol) network, and in addition hereto, the picture information from a service provider. Moreover, each contents information from the contents information supply sources 4-1 to 4-m is received in the collecting/distributing section 111 via individual optical fibers, as an optical signal having mutually different light wavelengths $\lambda_{c1}$ to $\lambda_{cm}$ each determined for the each supply source in advance.

Moreover, under control of a contents server 170 constituting a server 192 as described later, the channel selectors 112-1 to 112-n is adapted to selectively output the optical signal (an optical signal in which the contents information is modulated) containing the contents information selected in each user station 300-1 to 300-n from among the n sets of parallel optical signals distributed by the collecting/distributing section 111. This allows the central station 100 to transmit the optical signal containing the contents information, which the user stations 300-1 to 300-n themselves selected, to the user stations 300-1 to 300-n.

Figure 2:
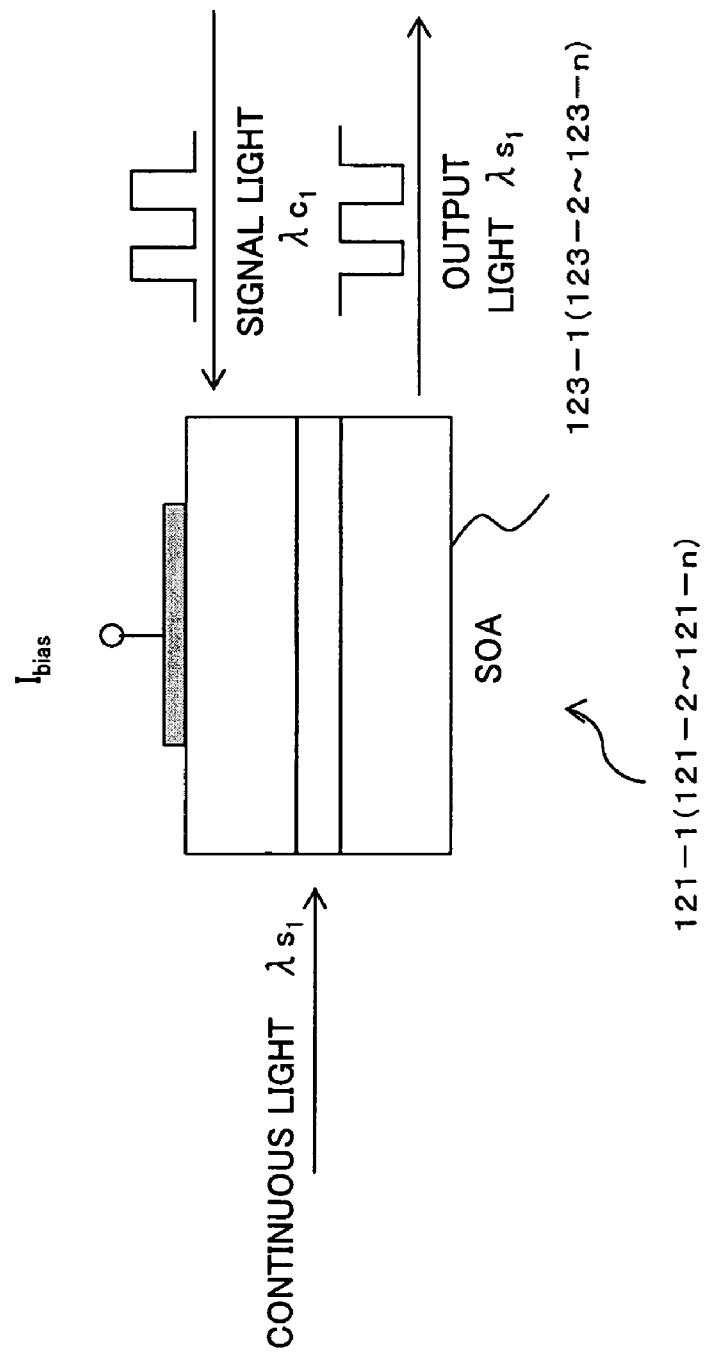
FIG. 2 and FIG. 3 are views for explaining wavelength conversion in a conversion processing section.

Moreover, the wavelength conversion sections 120-1 to 120-n include conversion processing sections 121-1 to 121-n containing semiconductor optical amplifiers (SOAs) 123-1 to 123-n as shown in FIG. 2, and light sources 122-1 to 122-n which emit continuous light (white light) having wavelengths $\lambda_{s1}$ to $\lambda_{sn}$ assigned as described above, respectively. As these light sources 122-1 to 122-n, a LD (Laser Diode) or a SD (Super Continuum) can be used, for example. In addition, the above-described semiconductor optical amplifiers 123-1 to 123-n can be monolithically integrated with the light sources 122-1 to 122-n such as the LD, respectively.

Figure 3:
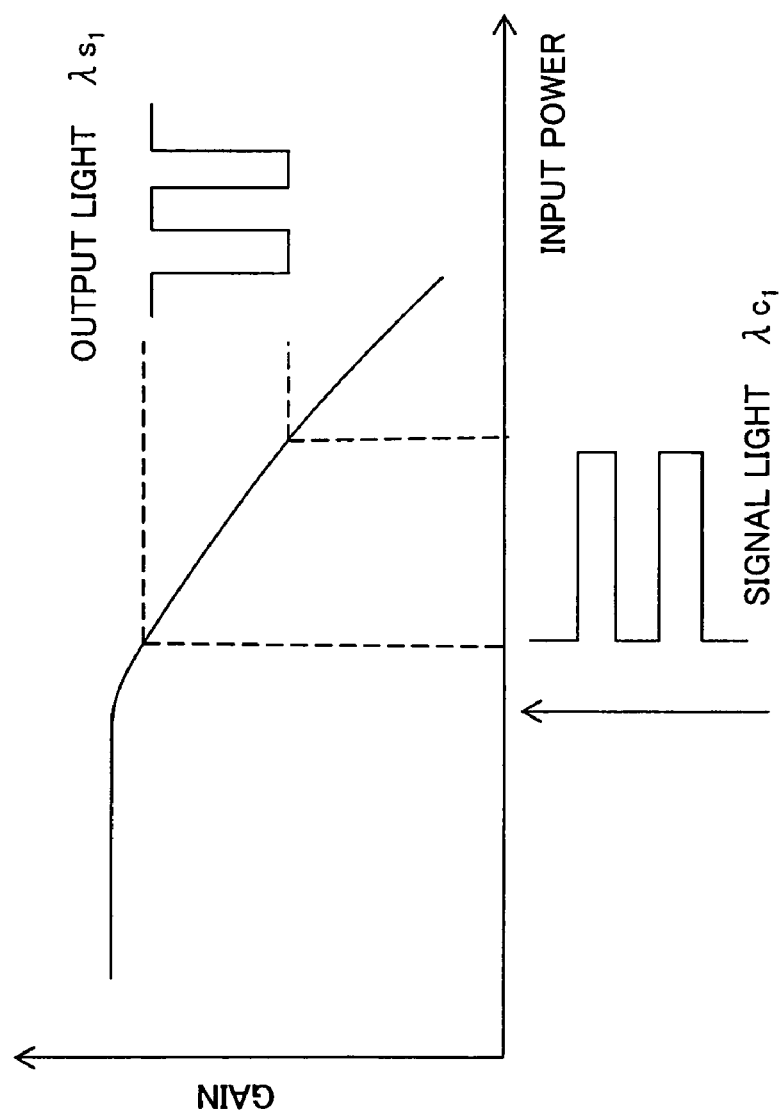

FIG. 2 and FIG. 3 are views for explaining that, in the conversion processing sections 121-1 to 121-n that receive the light from the light sources 122-1 to 122-n, the optical signal from the channel selectors 112-1 to 112-n is wavelength-converted due to a XGM (Cross Gain Modulation) effect.

For example, when paying attention to the wavelength conversion section 120-1, inputting the continuous light from the light source 122 and the optical signal from the channel selector 112-1 oppositely into the semiconductor optical amplifier 123-1, which is excited by supplying a bias-current $I_{bias}$, allows the optical signal, which has a wavelength $_{s1}$ of the continuous light from the light source 122 and simultaneously therewith, has the contents information modulated, to be emitted.

That is, as shown in FIG. 3, when the semiconductor optical amplifiers 123-1 to 123-n are in a state of a gain saturation, the number of carriers of the semiconductor optical amplifiers 123-1 to 123-n will vary in response to turning on and off (i.e., rising and falling of the optical pulse) the signal light incident from the channel selectors 112-1 to 112-n. Incidentally, when the continuous light from the light sources 122-1 to 122-n, which are the light to be amplified, is incident thereon, there will be produced a change in the strength of the output light because an amplification factor thereof is proportional to the number of carriers.

In other words, the turning on and off of the original signal light is transcribed to the light from the light sources 122-1 to 122-n to be amplified so as to have the same light pulse waveform as that of the optical signal from the channel selectors 112-1 to 112-n. Consequently, this amplified light from the conversion processing sections 121-1 to 121-n can be assumed to be an optical signal as a wavelength conversion result of the optical signal from the channel selectors 112-1 to 112-n, respectively. Note that in this case, the phase, at which the optical signal being outputted is turned on and off, is inverted from that of the original signal light.

In other words, the optical signal having the wavelengths $\lambda_{s1}$ to $\lambda_{sn}$ outputted from the above-described conversion processing sections 121-1 to 121-n is outputted as the optical signal from the optical signal outputting section 191, and the above-described WDM multiplexer 130 is adapted to wavelength-multiplex the optical signal having the wavelengths $\lambda_{s1}$ to $\lambda_{sn}$ from the conversion processing sections 121-1 to 121-n is, and to transmit it via the first optical fiber 10 as the optical signal in which the contents information is multiplexed.

Next, a local equipment 200 constituting the transmission line 2 wavelength-separates the wavelength-multiplexed optical signal transmitted via the first optical fiber 10 from the WDM multiplexer 130, and outputs each wavelength-separated optical signal to the optical fibers 20-1 to 20-n leading to the user stations 300-1 to 300-n, to which the separated wavelengths are assigned, and also wavelength-multiplexes the optical signal (having mutually different wavelengths), in which the control information from each user station 300-1 to 300-n is modulated, to transmit it via an optical fiber 30.

To this end, the local equipment 200 includes an AWG (Arrayed Waveguide Grating) for delivery 210 as a passive element, multiplex-demultiplexers 220-1 to 220-n, and a WDM multiplexer 230. This local equipment 200 is provided at the position on the transmission line 2 relatively adjacent to each user station 300-1 to 300-n rather than to the central station 100 on the transmission line 2 (for example, on a telegraph pole near the user stations 300-1 to 300-n, or in a manhole, a hut, a cabinet, or an unattended station, or the like).

The AWG for delivery 210, into which the optical signal wavelength-multiplexed by the WDM multiplexer 130 is inputted via the first optical fiber 10, separates this wavelength-multiplexed light and emits it to the optical fibers 20-1 to 20-n leading to the user stations 300-1 to 300-n, to which the separated wavelengths are assigned, respectively.

Figure 4A:
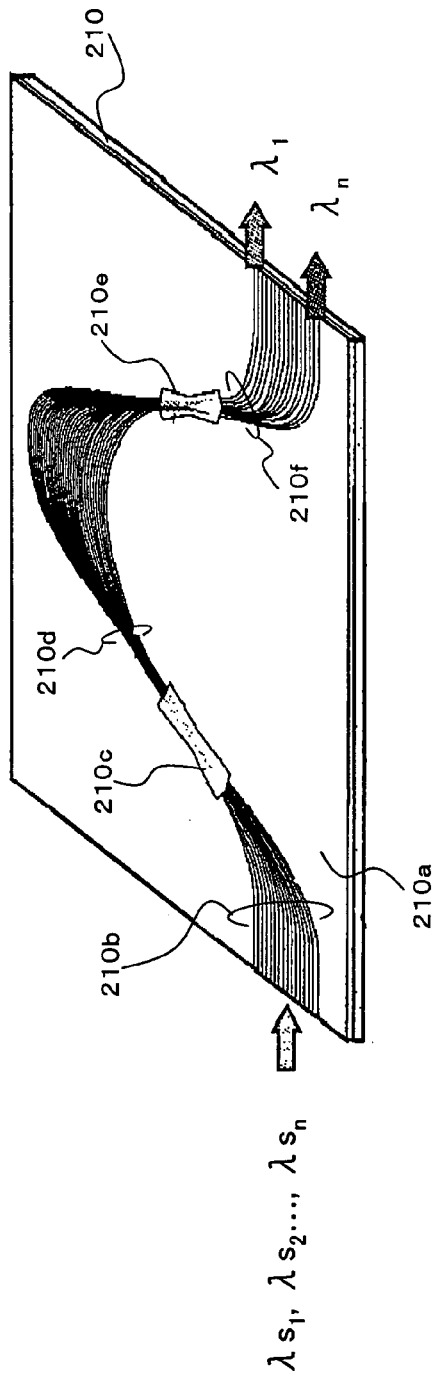
FIG. 4(a) and FIG. 4(b) are views for explaining an operation of an AWG for delivery.
Figure 4B:
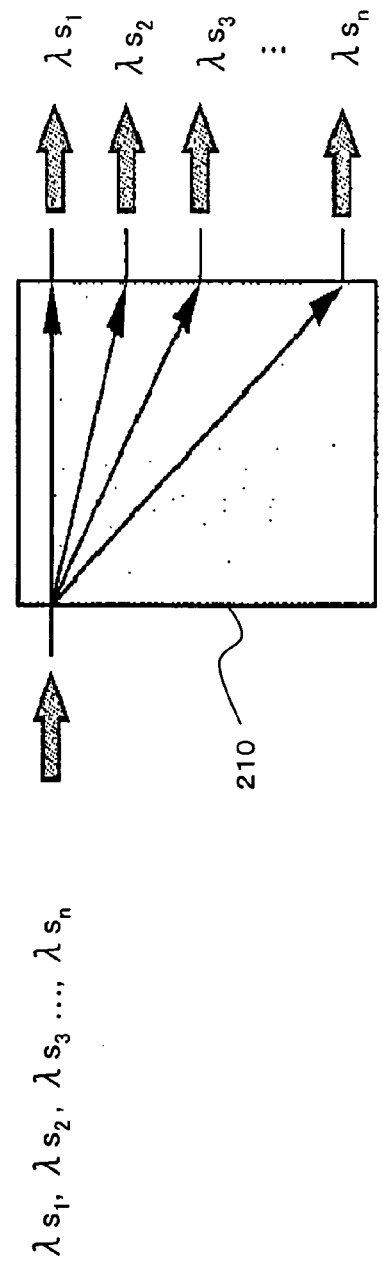

FIG. 4(*a*) and FIG. 4(*b*) are views for explaining an operation of the AWG for delivery 210, and FIG. 4(*a*) is a schematically perspective view of the AWG for delivery 210, and FIG. 4(*b*) is a view for explaining the wavelength separation function by the AWG for delivery 210.

That is, as shown in FIG. 4(*a*), the AWG for delivery 210 is formed by integrating n pieces of input waveguides 210*b*, a lens waveguide 210*c*, an array waveguide 210*d*, a lens waveguide 210*e* and *n* pieces of output waveguides 210*f* into a glass film of a silicon substrate 210*a* using a PLC (Planer Light wave Circuit) technique.

Moreover, in the lens waveguide 210*e*, the lights from the array waveguides in this AWG for delivery 210, as shown in FIG. 4(*b*), the optical signal incident from one of the n pieces of input waveguides 210*b* is expanded by the lens waveguide 210*c*, and branches off into the n pieces of array waveguides 210*d*. There will be produced a phase difference between the light propagating over each of the n pieces of array waveguides 210*d* and the light propagating over the other due to a difference between the waveguide lengths thereof.

Furthermore, in the lens waveguide 210*e*, the lights from the array waveguides 210*d* are multiplexed and gather into specific output waveguides 210*f* due to the produced phase difference. Because the gathering position varies depending on the wavelength of the light, the wavelength-multiplexed light is outputted from the different output waveguide 210*f* for each wavelength. Thereby, as shown in FIG. 4(*b*), if the wavelength-multiplexed light having wavelengths $\lambda_{s1}$ to $\lambda_{sn}$ is inputted to the input waveguide 210*b*, this light is wavelength-separated, and the wavelength-separated optical signals are emitted from the n pieces of output waveguides 210f.

Moreover, n piece of array waveguides 210f are connected to the second optical fibers 20-1 to 20-n so that the wavelength of the wavelength separated light, which is emitted from each of the n pieces of output waveguides 210f to enter the user stations 300-1 to 300-n via the second optical fibers 20-1 to 20-n, will be identical to the wavelength assigned for the each user station 300-1 to 300-n.

This enables a simple operation of the wavelength routing, which does not require signal controlling or the like by the outside. That is, the user's wavelength corresponds to an equalizing wavelength of the AWG for delivery 210, so in the AWG for delivery 210, the wavelength is selected/distributed according to the waveguide route, which is determined for each wavelength in advance, and is delivered to each user station 300-1 to 300-n.

In other words, the contents information for each user station 300-1 to 300-n is modulated into an optical signal having the wavelength assigned for each user station, and is transmitted as the wavelength-multiplexed optical signal, while in the AWG for delivery 210 as the passive element, the above-described wavelength-multiplexed optical signal from the first optical fiber 10 is wavelength-separated, and the wavelength-separated optical signals are outputted to the second optical fibers 20-1 to 20-n leading to the corresponding user stations 300-1 to 300-n, respectively.

Moreover, the WDM multiplexer 230 constituting the local equipment 200 functions as a control information multiplexing section which wavelength-multiplexes the control information from each user station 300-1 to 300-n as described later, wherein the wavelength-multiplexed light, in which the control information is modulated, is outputted via the second optical fiber 20.

In addition, the control information from the each user station 300-1 to 300-n described above, which is an optical signal having mutually different wavelengths, is modulated into an optical signal having a wavelength that is also different from the wavelength assigned for the contents information delivery to each user station 300-1 to 300-n.

Furthermore, the first multiplex-demultiplexers 220-1 to 220-n constituting the local equipment 200 output the optical signal wavelength-separated by the AWG for delivery 210 to the second optical fibers 20-1 to 20-n leading to the corresponding user stations 300-1 to 300-n, respectively, and also output to the WDM multiplexer 230 the control information from the control information outputting section (refer to numerals 310-1 to 310-n, and 320-1 to 320-n) of each user station 300-1 to 300-n as described later.

Moreover, the user stations 300-1 to 300-n include multiplex-demultiplexers 310-1 to 310-n, STBs (Set Top Box) 320-1 to 320-n, and a contents information reproducer 330-1 such as a television and a personal computer, respectively (illustration of the multiplex-demultiplexers 310-2 to 310-n and the STBs 320-2 to 320-n is omitted in FIG. 1).

Here, the multiplex-demultiplexers 310-1 to 310-n output the optical signal containing the contents information transmitted via the second optical fibers 20-1 to 20-n, to the STBs 320-1 to 320-n, and also output the control information from the STBs 320-1 to 320-n as described below, to the first multiplex-demultiplexers 220-1 to 220-n via the second optical fibers 20-1 to 20-n, respectively.

Accordingly, the control signal outputted via the above-described second optical fibers 20-1 to 20-n can be wavelength-multiplexed in the WDM multiplexer 230 via the first multiplex-demultiplexers 220-1 to 220-n to transmit it to the server 192 of the central station 100 via the third optical fiber 30.

The STBs 320-1 to 320-n are adapted to output the optical signal, in which the user information as the control information such as a delivery request, an authentication request, or a channel selecting request from the user stations 300-1 to 300-n is modulated. The optical signal as this control information, which is an optical signal having mutually different wavelengths, has wavelengths $\lambda_{u1}$ to $\lambda_{un}$ that are also different from the wavelengths $\lambda_{s1}$ to $\lambda_{sn}$ each assigned for the contents information delivery to each user station 300-1 to 300-n.

For example, a channel (a type of contents information to be delivered) selected by the user station 300-1 is modulated as an optical signal having the wavelength $\lambda_{u1}$ as the channel selection information from the STB 320-1.

In other words, the above-described STBs 320-1 to 320-n and multiplex-demultiplexers 310-1 to 310-n function as the control information outputting section which outputs, via the second optical fibers 20-1 to 20-n, the control information for delivering the contents information as an optical signal having mutually different wavelengths, which is $\lambda_{u1}$ to $\lambda_{un}$ that are also different from the wavelengths $\lambda_{s1}$ to $\lambda_{sn}$ each assigned for the contents information delivery to each user station 300-1 to 300-n.

Incidentally, the server 192 of the central station 100 includes a WDM demultiplexer 140, an optical-electric converter 150, a subscriber administration server 160, a contents server 170, and an accounting server 180.

Here, the WDM demultiplexer 140 wavelength-separates the wavelength-multiplexed optical signal having the control information modulated, which is transmitted via the third optical fiber 30, while the optical-electric converter 150 converts each control information wavelength-separated in the WDM demultiplexer 140 into an electrical signal from an optical signal, and each conversion result is provided to the subscriber administration server 160 as a control information from the user stations 300-1 to 300-n.

The subscriber administration server 160 administrates a subscriber information in the user stations 300-1 to 300-n upon receipt of the control information from the user stations 300-1 to 300-n. Moreover, the contents server 170 controls the channel selectors 112-1 to 112-n when the control information inputted to the subscriber administration server 160 is a control designating information such as a selection information of the contents information from the user stations 300-1 to 300-n. This allows the contents server 170 to delivery-control the contents information corresponding to the control information from the user stations 300-1 to 300-n.

In other words, the channel selectors 112-1 to 112-n is adapted to selectively output the optical signal, in which the desired contents information designated by the control information from the user stations 300-1 to 300-n is modulated, from among the contents information distributed by the collecting/distributing section 111.

In addition, the first optical fiber 10 and the third optical fiber 30 between the above-described central station 100 and local equipment 200 are formed of a separate-conductor optical fiber, and the second optical fibers 20-1 to 20-n are formed of a single-conductor optical fiber, respectively.

Figure 5:
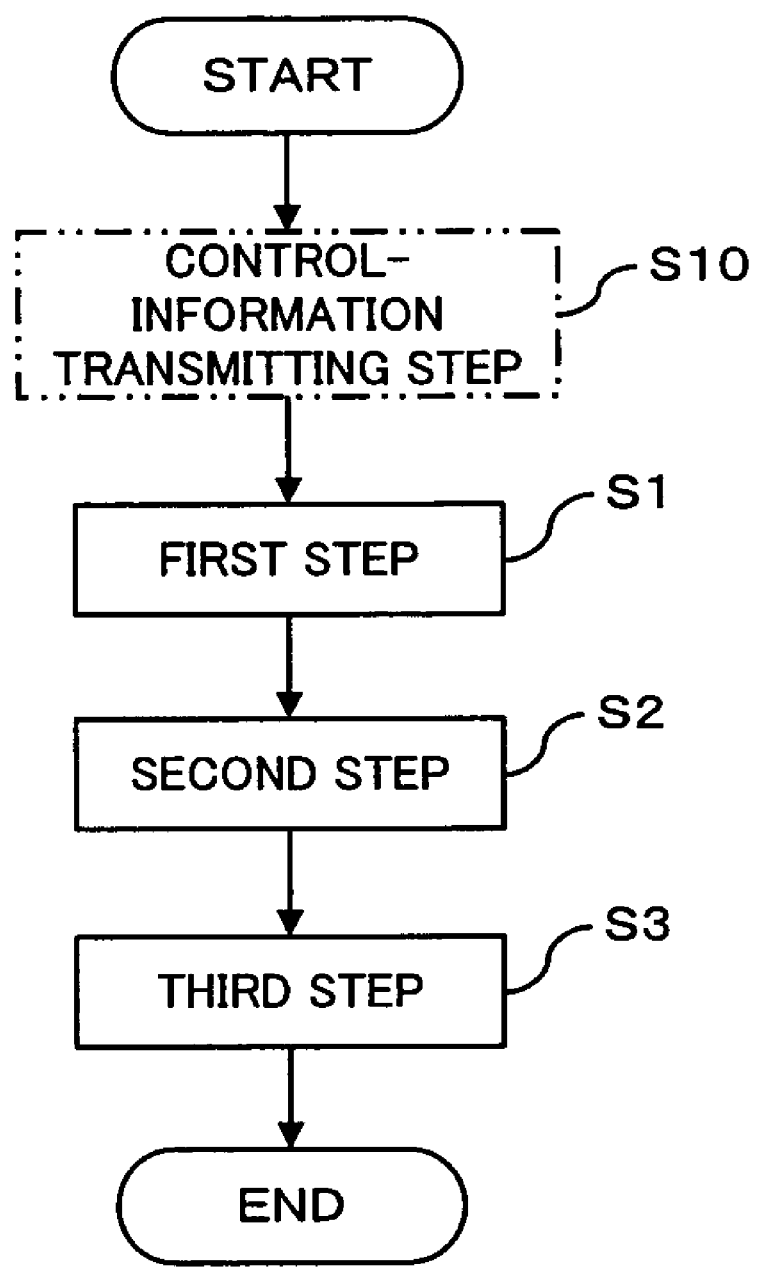
FIG. 5 is a flowchart for explaining an operation of the contents delivery system concerning the first embodiment of the present invention.

With the above-described configuration, an operation of the contents delivery system 1 concerning a first embodiment of the present invention will be described with reference to a block diagram shown in FIG. 1, and a flowchart shown in FIG. 5. That is, in the contents delivery system 1, as shown below, the contents information is delivered by transmitting the optical signal from the central station 100 to the user stations 300-1 to 300-n via the transmission line 2.

That is, in the optical-signal outputting section 191 of the central station 100, the optical signal containing the contents information is outputted as optical signals $\lambda_{c1}$ to $\lambda_{cm}$ of mutually different wavelengths each assigned for each user station (a first step; Step S1) in advance.

At this time, in the collecting/distributing section 111 of the optical-signal outputting section 191, the contents information to be delivered to each user station 300-1 to 300-n is received as an optical signal from the outside (a contents receiving step).

Specifically, in the collecting/distributing section 111, for example, m kinds of contents information are collected from external contents information supply sources 4-1 to 4-m, while the collected contents information is distributed into n sets of parallel optical signals. Subsequently, the channel selectors 112-1 to 112-n selectively output the optical signal, in which the contents information of the kind to be delivered by the user stations 300-1 to 300-n is modulated from among the above-described optical signals (the optical signal in which m kinds of contents information are modulated, i.e., the optical signal having m channels) having $\lambda_{c1}$ to $\lambda_{cm}$ under control of the contents server 170.

In addition, in this case, the subscriber administration server 160 administrates the contents information to be delivered to each user station 300-1 to 300-n while the contents server 170 controls the channel selectors 112-1 to 112-n, thereby to selectively output the optical signal, in which the contents information to be delivered is modulated, from among the contents information from the contents-information supply sources 4-1 to 4-m.

Subsequently, in the wavelength conversion sections 120-1 to 120-n, the optical signal $\lambda_{ci}$ (i; 1-m) of the contents information received by the collecting/distributing section 111 is converted into an optical signal having mutually different wavelengths $\lambda_{s1}$ to $\lambda_{sn}$ each assigned for each user station 300-1 to 300-n in advance to output it (a wavelength converting step).

At this time, the conversion processing sections 121-1 to 121-n receive the optical signal (the optical signal from the channel selectors 112-1 to 112-n) that forms the contents information received in the contents receiving step, and the light (having the wavelengths each assigned for each user station 300-1 to 300-n) emitted by luminescence media 122-1 to 122-n. And then the conversion processing section 121-1 to 121-n convert them into an optical signal having the wavelength for each user station 300-1 to 300-n due to a mutual gain modulation effect.

Subsequently, in the WDM multiplexer 130 of the central station 100, the optical signals $\lambda_{s1}$ to $\lambda_{sn}$ having a plurality of wavelengths outputted in the first step are transmitted via the transmission line 2 (a second step; Step S2). Specifically, the optical signals $\lambda_{s1}$ to $\lambda_{sn}$ outputted in the optical-signal outputting section 191 are wavelength-multiplexed in the WDM multiplexer 130, and are transmitted via the transmission line 2 as a multiplexed optical signal in which the contents information is multiplexed. At this time, the multiplexed optical signal from the above-described WDM multiplexer 130 is transmitted via the first optical fiber 10 constituting the transmission line 2.

Furthermore, the multiplexed optical signal multiplexed in the WDM multiplexer 130 is wavelength-separated in the local equipment 200 on the transmission line 2 (a wavelength separating step). Namely, the AWG for delivery 210 as the passive element of the local equipment 200 wavelength-separates the wavelength-multiplexed optical signal from the first optical fiber 10, and also outputs the optical signal wavelength-separated via the multiplex-demultiplexers 220-1 to 220-n to the second optical fibers 20-1 leading to the user stations 300-1 to 300-n, to which the wavelength of the relevant optical signal is assigned.

In other words, in the local equipment 200, the wavelength-multiplexed optical signal having propagated via the first optical fibers 10 is automatically outputted to the second optical fibers 20-1 to 20-n leading to the user stations 300-1 to 300-n without a signal control from the outside.

Then, each user station 300-1 to 300-n receives only the optical signal having the wavelength of its own user equipment 300-1 to 300-n assigned from among the optical signals wavelength-separated in the local equipment 200 (a third step; Step S3).

In the user stations 300-1 to 300-n, the optical signal from the second optical fibers 20-1 to 20-n is received by the STBs 320-1 to 320-n via multiplex-demultiplexers 310-1 to 310-n, and is converted into an electrical signal, which is reproduced in the contents information reproducers 330-1 such as a television and a personal computer. In this case, in the equipment combining a light receiving function with a contents-information reproducing function, the optical signal from the second optical fibers 20-1 to 20-n may be received to reproduce the contents information.

In this way, it is possible to carry out the wavelength routing to the user stations 300-1 to 300-n from the central station 100 with the optical signal. Namely, the conversion into an optical signal having the wavelength assigned to the user stations 300-1 to 300-n has been already made in the wavelength conversion sections 120-1 to 120-n, whereby carrying out the wavelength routing by setting transmission wavelengths $\lambda_{s1}$ to $\lambda_{sn}$ in relationship to the user stations 300-1 to 300-n, being deliverees, as an address wavelength. That makes it possible to deliver a large-capacity contents with the use of this simple technique without carrying out the signal controlling for direction changes or the like with respect to each address.

In addition, when controlling the channel selectors 112-1 to 112-n in the above-described contents server 170, the selection information for the contents information to be delivered to each user station 300-1 to 300-n is received from the subscriber administration server 160. According to the present invention, other than the above, each user station 300-1 to the 300-n itself may control the channel selectors 112-1 to 112-n each by informing the server 192 of the selection information for the desired contents information for delivery, so that the contents information according to this desired delivery may be delivered.

In this case, as a control information transmitting step prior to the above-described first step, the control information (containing the selection information regarding the desired contents information for delivery) for delivering the contents information is transmitted to the central station 100 from each user station 300-1 to 300-n (Step S10).

Specifically, each user station 300-1 to 300-n outputs the control information (a contents-selection information desired to receive) for delivering the contents information, as described above, to the local equipment 200 via the second optical fibers 20-1 to 20-n, as the optical signal having mutually different wavelengths, which are $\lambda_{u1}$ to $\lambda_{un}$ that are also different from the wavelengths each assigned for the contents information delivery to each user station (a control information outputting step).

Accordingly, the second optical fibers 20-1 to 20-n are adapted to bidirectionally propagate the optical signal in which the contents information to each user station 300-1 to 300-n is modulated, and the optical signal in which the control information from the user stations 300-1 to 300-n is modulated.

Subsequently, the local equipment 200 wavelength-multiplexes the optical signal having the control information modulated, which is inputted via the second optical fibers 20-1 to 20-n from each user station 300-1 to 300-n, and then transmits this to the central station 100 via the third optical fiber 30 for the control information. The third optical fiber 30 is different from the first optical fiber 10 and the second optical fibers 20-1 to 20-n (a control information multiplexing step).

Accordingly, upon receipt of the contents-selection information as the control information from the user stations 300-1 to 300-n, the server 192 of the central station 100 outputs the optical signal containing contents information in wavelengths $\lambda_{s1}$ to $\lambda_{sn}$ each assigned for each user station 300-1 to 300-n, according to the control information from the user stations 300-1 to 300-n, as the operation in the above-described first step.

Specifically, the WDM demultiplexer 140 of the server 192 wavelength-separates the wavelength-multiplexed optical signal transmitted via the third optical fiber 30, while the optical-electric converter 150 converts the optical signal wavelength-separated in the WDM demultiplexer 140 into an electrical signal, and supplies it to the subscriber administration server 160 as an electric signal, in which the control information from each user equipment 300-1 to 300-n is modulated.

Upon receipt of the control information from the user stations 300-1 to 300-n, when setting or changing the contents information to be delivered to the user stations 300-1 to 300-n, the subscriber administration server 160 outputs an instruction to its effect to the contents server 170. This allows the contents server 170 to control the channel selectors 112-1 to 112-n, and each user station 300-1 to 300-n to deliver the desired contents information.

In addition, when the accounting occurs, the subscriber administration server 160 controls an accounting server 180, thereby to update the charging information to each subscriber as required.

Incidentally, although the above-described delivery of the contents information is carried out in accordance with the contract contents of the delivery service concluded between each user itself in the user stations 300-1 to 300-n and the communication common carrier that administrates the central station 100, this contract contents can include, for example, an alternative contract of three service ranks of (1) an IP information contents, (2) a commercial broadcasting contents, and (3) a high-definition contents depending on the quality grade of the contents.

It is thought that replacement of the equipment or the like will be necessitated at the time of changing the contract concluded depending on such a service rank, however in the contents delivery system of the present invention, only replacement of the STBs 320-1 to 320-n in the user's premises is required, whereby it is not necessary to change the apparatus of the local equipment 200. Moreover, the central station 100 can cope with this situation only by changing the user's basic data stored in the database of the subscriber administration server 160.

Furthermore, the first optical fiber 10 and the second optical fibers 20-1 to 20-n, which are the transmission lines for contents delivery, can be used in common for each service rank, whereby there is no need to change anything. Of course, in the case where a contract for receiving the contents of all quality grades is concluded, it is good enough to prepare a STB including such performances and no replacement of the optical fibers 10 and 20 or the like is necessary in this case as well.

In this way, according to the first embodiment of the present invention, there is an advantage that by wavelength-multiplex-transmitting the optical signal having mutually different wavelengths each assigned for each user station 300-1 to 300-n in advance through the first to third steps, a large-capacity signal can be delivered while the central station 100 and local equipment 200 having a simple configuration are employed as a delivery node, thus allowing even the contents delivery of which the required bandwidths differ greatly to be done with a common (one) network configuration.

Moreover, there is an advantage that the serviceability to the user stations 300-1 to 300-n can be improved because the channel selection information can be transmitted from the user stations 300-1 to 300-n to the central station 100 as the control information, while in the central station 100, the contents information can be transmitted based on the control information from the user stations 300-1 to 300-n.

Moreover, an important optical component such as a laser, and the conversion processing sections 121-1 to 121-n as a monolitically integratable element are used for the light wavelength conversion in the access system, so it is possible to attain a lower power consumption of the central station 100, thereby to realize an optical access system in a realistic cost and having a realistic mounting area.

Furthermore, the functional section for carrying out the wavelength conversion, the wavelength routing or the like can be constituted of only hardware elements such as the wavelength conversion sections 120-1 to 120-n, the WDM multiplexer 130, or the AWG for delivery 210, whereby these functions can be carried out without depending on the light wavelength, the transmission rate, the coding format, the signal format, or the like of the delivery signal. Therefore, there is also an advantage that the protocol processing or the like by software is not necessitated, thus enabling the signal transfer delay to be minimized.

In addition, in the above-described embodiment, the WDM multiplexer 130 wavelength-multiplexes the output optical signal from the optical-signal outputting section 191, and transmits it on the transmission line 2 as the multiplexed optical signal, however, according to the present invention, in the case where the user stations 300-1 to 300-n are arranged near the central station 100, the connection between the central station 100 and each user station 300-1 to 300-n may be made with the individual optical fibers in stead of providing the WDM multiplexer 130 and the local equipment 200.

Moreover, generally, the transmittable distance from the central station 100 to the each user station 300-1 to 300-n via the top of poles, in which the local equipment 200 is installed, is equivalent to that of the fiber optics communication, which is several tens of km. In order to extend this distance, it is also possible to insert an optical amplifier (EDFA or the like), a wavelength-dispersion compensator, or the like on the transmission line 2, suitably.

Furthermore, in the case where the contents information is transmitted at a transmission rate of, for example, 10 Gbs or more, a polarized-wave dispersion compensator or the like can be also inserted as required on the transmission line 2 or the like depending on the characteristics of the optical fiber. Moreover, when transmitting the optical signal from the central station 100 on the transmission line 2, a gain equalizer (GEQ) for light, a optical amplifier for collectively processing multiple wavelengths, or the like may be inserted as required.

(b) Description of a Second Embodiment of the Present Invention

Figure 6:
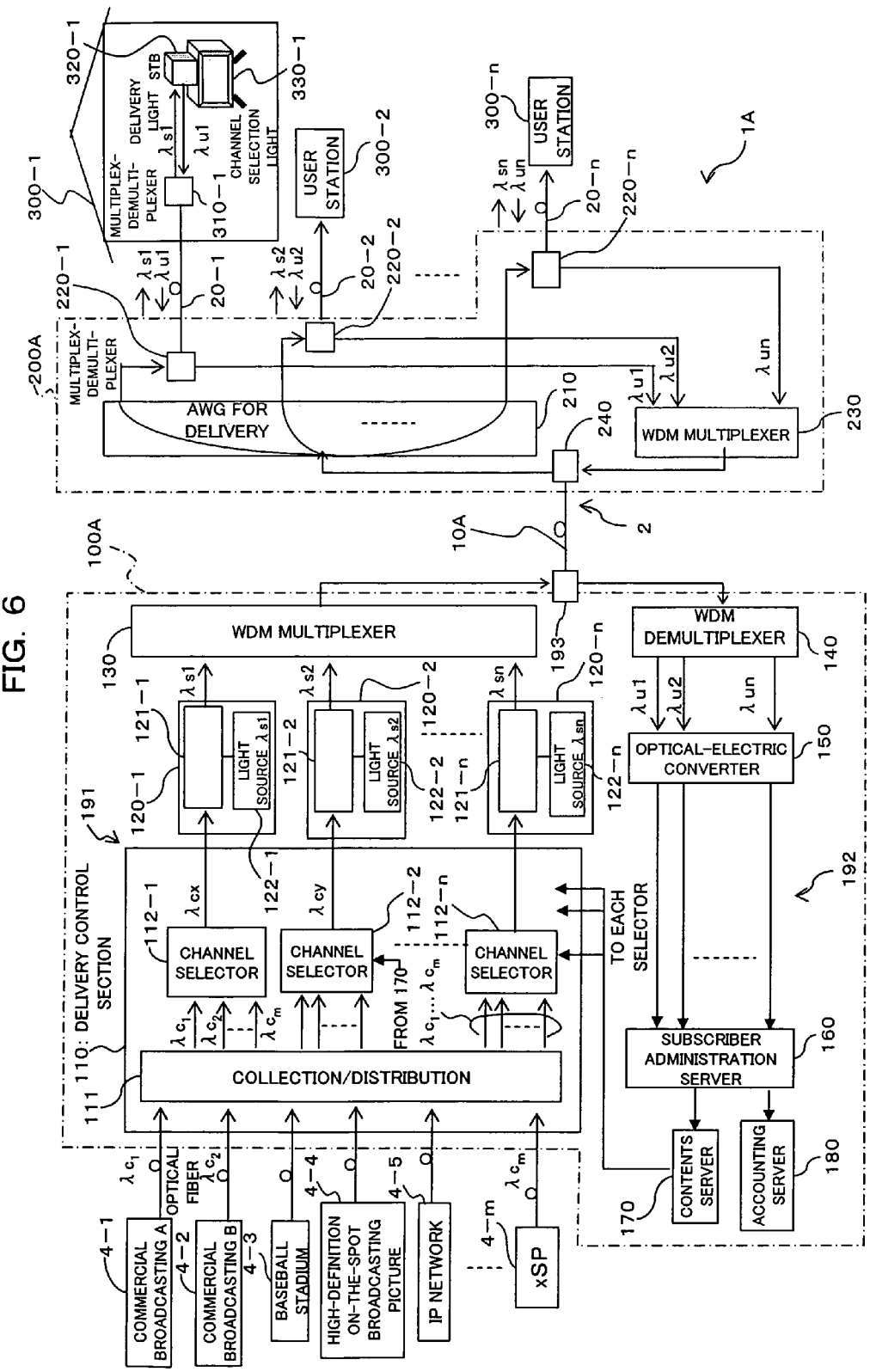
FIG. 6 is a block diagram showing a contents information delivery system concerning a second embodiment of the present invention.

FIG. 6 is a block diagram showing a contents information delivery system concerning a second embodiment of the present invention. A contents information delivery system 1A shown in FIG. 6 differs, as compared with the one in the above-described first embodiment, in the point that the connection of a central station 100A and a local equipment 200A is made with only a single-conductor optical fiber 10A, and via this optical fiber 10A, wavelength-multiplexed signals (having wavelengths $\lambda_{u1}$ to $\lambda_{un}$), in which the control information is modulated, are transmitted together with wavelength-multiplexed signals (having wavelengths $\lambda_{s1}$ to $\lambda_{sn}$), in which the contents information is modulated.

To this end, the contents information delivery system 1A concerning the second embodiment of the present invention includes the central station 100A having an optical multiplex-demultiplexer 193 added to the configuration of the central station 100 (refer to FIG. 1) concerning the above-described first embodiment, and simultaneously therewith, includes an optical multiplex-demultiplexer 240 added to the configuration of the local equipment 200 (refer to FIG. 1). In addition, the same numerals in FIG. 6 as those of FIG. 1 show substantially the same portions.

That is, the optical multiplex-demultiplexer 240 of the local equipment 200A is adapted to output the optical signal wavelength-multiplexed by the WDM multiplexer 230 to the central station 100A via the optical fiber 10A, and also to output the wavelength-multiplexed optical signal from the optical fiber 10A to the AWG for delivery 210.

Moreover, the optical multiplex-demultiplexer 193 of the central station 100A is adapted to transmit the wavelength-multiplexed optical signal from the WDM multiplexer 130 to the local equipment 200A via the optical fiber 10A, and also to output the wavelength-multiplexed optical signal from the optical fiber 10A to the WDM demultiplexer 140.

In other words, the above-described optical fiber 10A has both of the function as the first optical fiber 10 in the above-described first embodiment and the function as the third optical fiber 30.

With the above-described configuration, also in the contents information delivery system 1A concerning the second embodiment of the present invention, similarly to the case of the above-described first embodiment, the contents information is delivered by transmitting the optical signal from the central station 100A to the user stations 300-1 to 300-n via the transmission line 2, through the processes in the first step to the third step.

That is, the optical multiplex-demultiplexer 193 of the central station 100 transmits the multiplexed optical signal in which the contents information is multiplexed in the WDM multiplexer 130 via the transmission line 2. At this time, the multiplexed optical signal from the above-described WDM multiplexer 130 is transmitted via the optical fiber 10A which forms the transmission line 2.

At this time, when each user station 300-1 to the 300-n itself informs the server 192 of the selection information of the contents information, which is desired to be delivered, as the control information, the control information (containing the selection information of the contents information desired to be delivered) for delivering the contents information is transmitted to the central station 100A from each user station 300-1 to 300-n as the control information transmitting step prior to the first step.

Specifically, each user station 300-1 to 300-n outputs the control information (contents-selection information desired to be received) for delivering the contents information to a local equipment 200A via the second optical fibers 20-1 to 20-n as an optical signal having mutually different wavelengths, which are $\lambda_{u1}$ to $\lambda_{un}$ that are also different from the wavelength assigned for the contents information delivery to each user station (a control information outputting step).

Next, the WDM multiplexer 230 of the local equipment 200A wavelength-multiplexes the optical signal having the control information modulated, which is inputted from each user station 300-1 to 300-n via the second optical fiber 20-1 to 20-n, and outputs it to the optical multiplex-demultiplexer 240. The optical multiplex-demultiplexer 240 transmits the wavelength-multiplexed optical signal from the WDM multiplexer 230 to the central station 100A via the optical fiber 10A (a control information multiplexing step).

The optical multiplex-demultiplexer 193 of the central station 100A outputs the optical signal forming the control information transmitted via the optical fiber 10A to the WDM demultiplexer 140. Thereby, the server 192 of the central station 100 outputs the optical signal containing the contents information in wavelengths $\lambda_{s1}$ to $\lambda_{sn}$ assigned for each user station 300-1 to 300-n, in response to the control information from the user stations 300-1 to 300-n.

In this way, also in the second embodiment of the present invention, there is an advantage that by wavelength-multiplex-transmitting the optical signal having mutually different wavelengths each assigned for each user station 300-1 to 300-n in advance through the first to third steps, a large-capacity signal can be delivered, while the central station 100A and the local equipment 200A having a simple configuration are employed as a delivering node, similarly to the case of the above-described first embodiment, thus enabling even the contents delivery of which the required bandwidths differ greatly to be done with a common (one) network configuration. In addition, there is an advantage that the optical fiber 10A connecting the central station 100A and the local equipment 200A can be formed of a single-conductor optical fiber, thereby allowing the transmission line configuration to be simplified further.

(c) Description of a Third Embodiment

Figure 7:
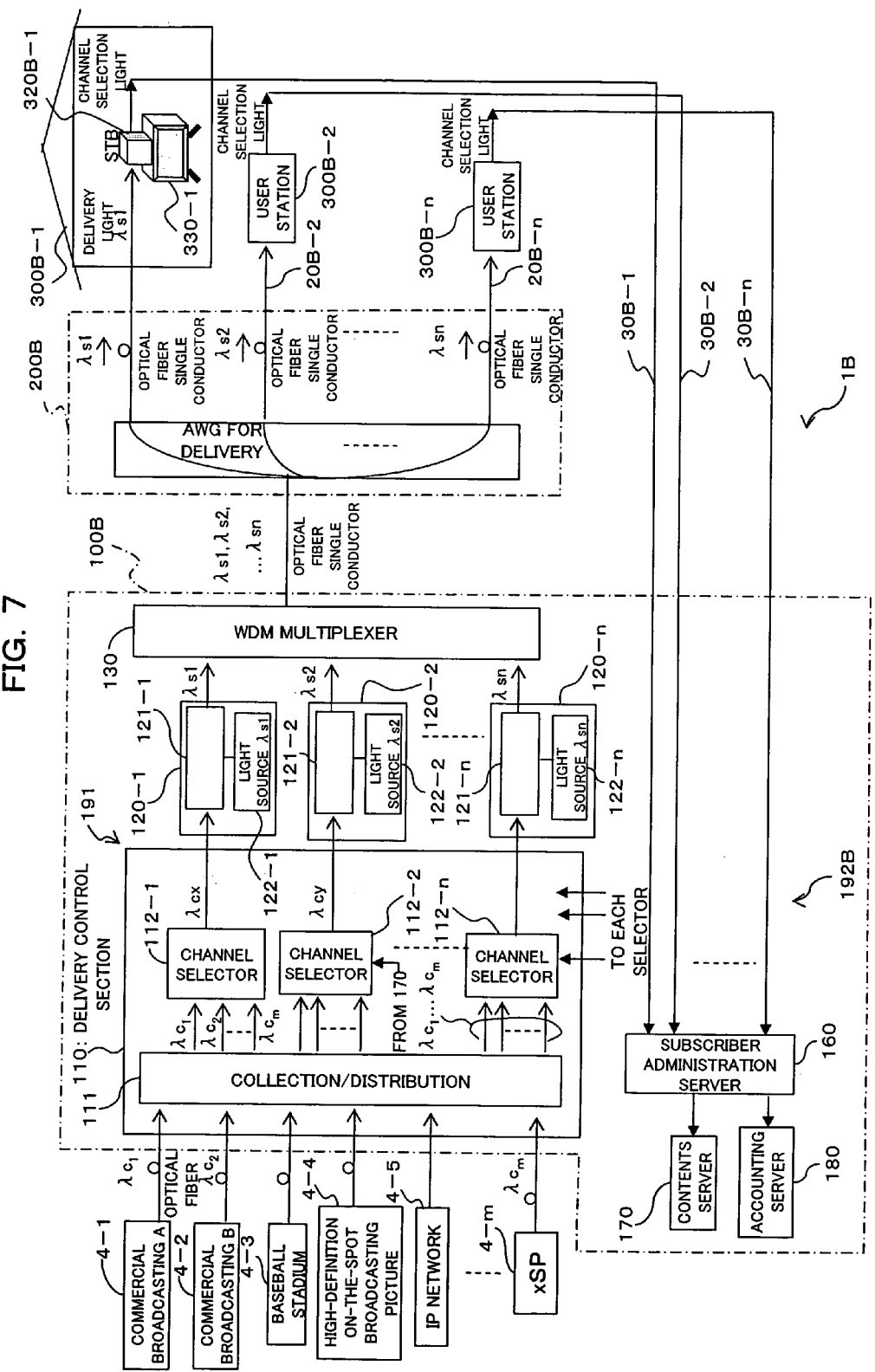
FIG. 7 is a block diagram showing a contents information delivery system concerning a third embodiment of the present invention.

FIG. 7 is a block diagram showing a contents information delivery system concerning a third embodiment of the present invention. A contents information delivery system 1B shown in FIG. 7 differs, as compared with the ones in the above-described first and second embodiments, in the point that the connection of a central station 100B and a local equipment 200B is made with only the single-conductor optical fiber 10 for delivering the contents information, and that other existing lines (for example, metallic lines 30B-1 to 30 B-n) are used for transmitting the control information from user stations 300B-1 to 300B-n to the central station 100B. The other configuration is basically the same. In addition, the same numerals in FIG. 7 as those of FIG. 1 and FIG. 2 show the same portions.

To this end, the central station 100B constituting the contents information delivery system 1B concerning the third embodiment of the present invention has a configuration including neither the WDM demultiplexer 140 nor the optical-electric converter 150, which are the functional sections to interface with the optical signal used for the control information, as compared with the central station 100 (refer to FIG. 1) concerning the above-described first embodiment.

Moreover, the local equipment 200B has a configuration including neither the optical multiplex-demultiplexers 220-1 to 220-n nor the WDM multiplexer 230, which are the functional sections for receiving and wavelength-multiplexing the optical signal used for the control information from user stations 300B-1 to 300B-n, as compared with the local equipment 200 shown in the above-described FIG. 1.

Furthermore, the user stations 300B-1 to 300B-n do not include the optical multiplex-demultiplexers 310-1 to 310-n, but include STBs 320B-1 to 320B-n and the contents information reproducers 330-1 to 330-n. It should be noted that regarding the optical multiplex-demultiplexers 310-2 to 310-n, the STBs 320B-2 to 320B-n, and the contents information reproducers 330-2 to 330-n, the illustration thereof is omitted.

Here, each STB 320B-1 to 320B-n of each user station 300B-1 to 300B-n has a function to transmit as an electrical signal, not as an optical signal, the control information such as the contents-selection information via metallic lines 30B-1 to 30B-n.

That is, the control information from the above-described user stations 300B-1 to 300B-n is directly inputted to the subscriber administration server 160 of the central station 100B via the metallic lines 30B-1 to 30B-n. In this case, a server 192B is constituted of the subscriber administration server 160, the contents server 170, and the accounting server 180.

In addition, in the third embodiment, fibers 20B-1 to 20B-n are for transmitting the optical signal wavelength-separated in the AWG for delivery 210, which forms the contents information to be addressed to each user station 300B-1-300B-n, and are formed of a single-conductor optical fiber.

With the above-described configuration, also in the contents information delivery system 1B concerning the third embodiment of the present invention, similarly to the case of the above-described first embodiment, the contents information is delivered by transmitting the optical signal from the central station 100B to the user stations 300B-1 to 300B-n via the transmission line 2, through the processes in the first step to the third step.

At this time, when each user station 300B-1 to 300B-n itself informs the server 192B of the selection information of the contents information desired to be delivered as the control information, the control information (containing the selection information of the contents information desired to be delivered) for delivering the contents information is transmitted to the central station 100B from each STB 320B-1 to STB-n of each user station 300B-1 to 300B-n, as the control information transmitting step prior to the first step.

Specifically, each user station 300B-1 to 300B-n individually outputs the control information (contents-selection information desired to be received) for delivering the contents information as described above to the subscriber administration server 160 via the metallic lines 300B-1 to 300B-n, which are the existing lines.

Thereby, the server 192B of the central station 100 outputs the optical signal containing the contents information in wavelengths $\lambda_{s1}$ to $\lambda_{sn}$ each assigned for each user station 300B-1 to 300B-n in response to the control information from the user stations 300B-1 to 300B-n.

In this way, also in the third embodiment of the present invention, there is an advantage that by wavelength-multiplex-transmitting the optical signal having mutually different wavelengths each assigned for each user station 300B-1 to 300B-n in advance through the first to third steps, a large-capacity signal can be delivered, while the central station 100A and local equipment 200A having a simple configuration are employed as a delivery node, similarly to the above-described first embodiment, thus enabling even the contents delivery of which the required bandwidths differ greatly to be done with a common (or unique) network configuration. In addition hereto, there is an advantage that an efficient network can be built because the existing line is used for the lines from the user stations 300B-1 to 300B-n toward the central station 100B of which the demand for a high transmission rate is relatively low.

(d) Description of a Fourth Embodiment

Figure 8:
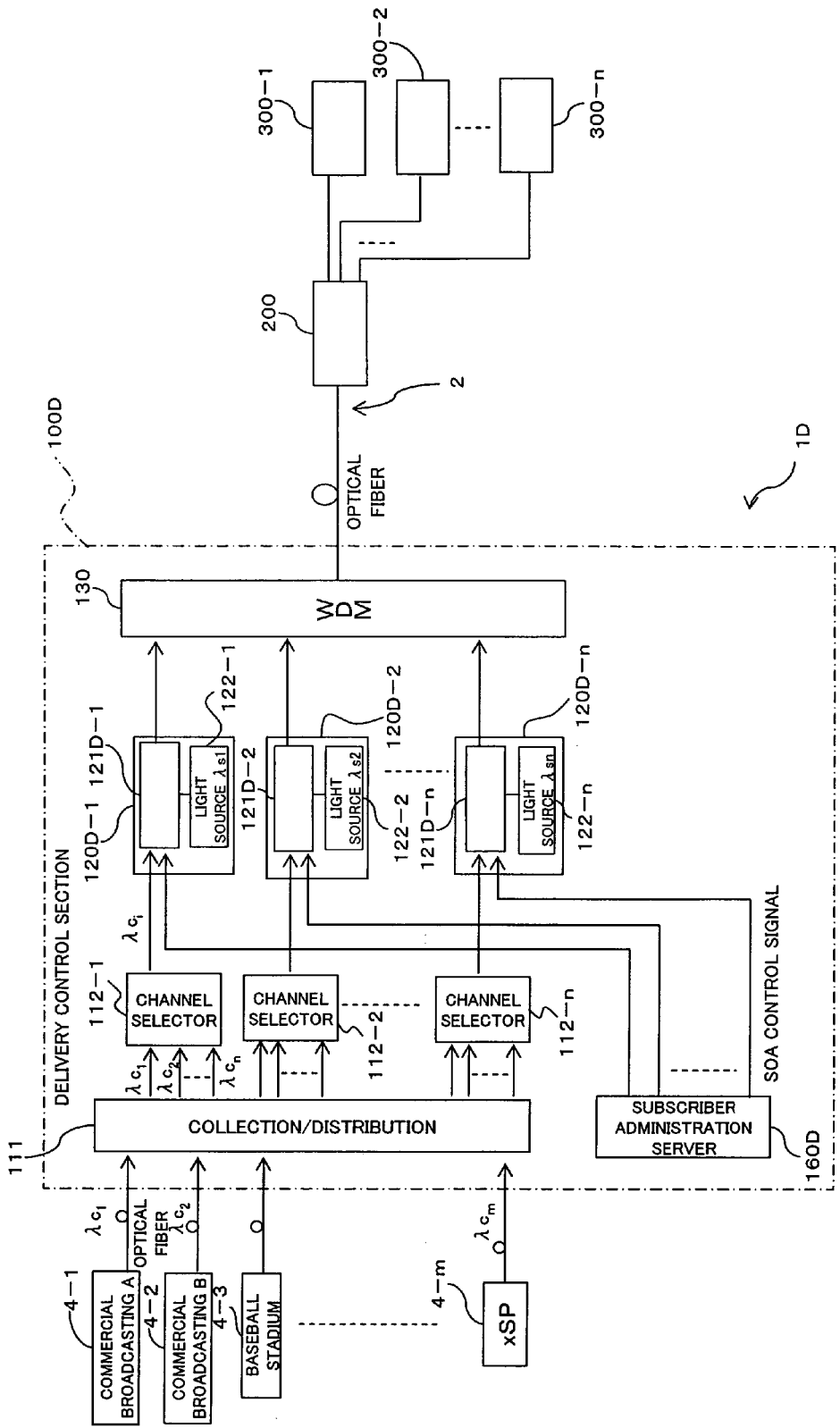
FIG. 8 is a block diagram showing a contents information delivery system concerning a fourth embodiment of the present invention.

FIG. 8 is a block diagram showing a contents information delivery system concerning a fourth embodiment of the present invention. A contents information delivery system 1D shown in FIG. 8 differs, as compared with the above-described first embodiment, in the point that when wavelength conversion sections 120D-1 to 120D-n output the optical signal converted into the optical signal having the wavelengths each assigned for each user station 300-1 to 300-n, a subscriber administration server 160D controls interruption/non-interruption of the outputting of the optical signal to which the wavelength is assigned corresponding to the prescribed user stations 300-1 to 300-n.

In addition, in FIG. 8, the configuration of the central station 100D differs from that of the above-described central station 100 shown in FIG. 1 in configurations of the wavelength conversion sections 120D-1 to 120D-n and the subscriber administration server 160, however portions other than this can be basically constituted in the same way. Moreover, in FIG. 8, regarding the WDM demultiplexer 140, the optical-electric converter 150, the contents server 170, and the accounting server 180, the illustration thereof is omitted, and the same numerals as those of FIG. 1 show substantially the same portions.

Figure 9:
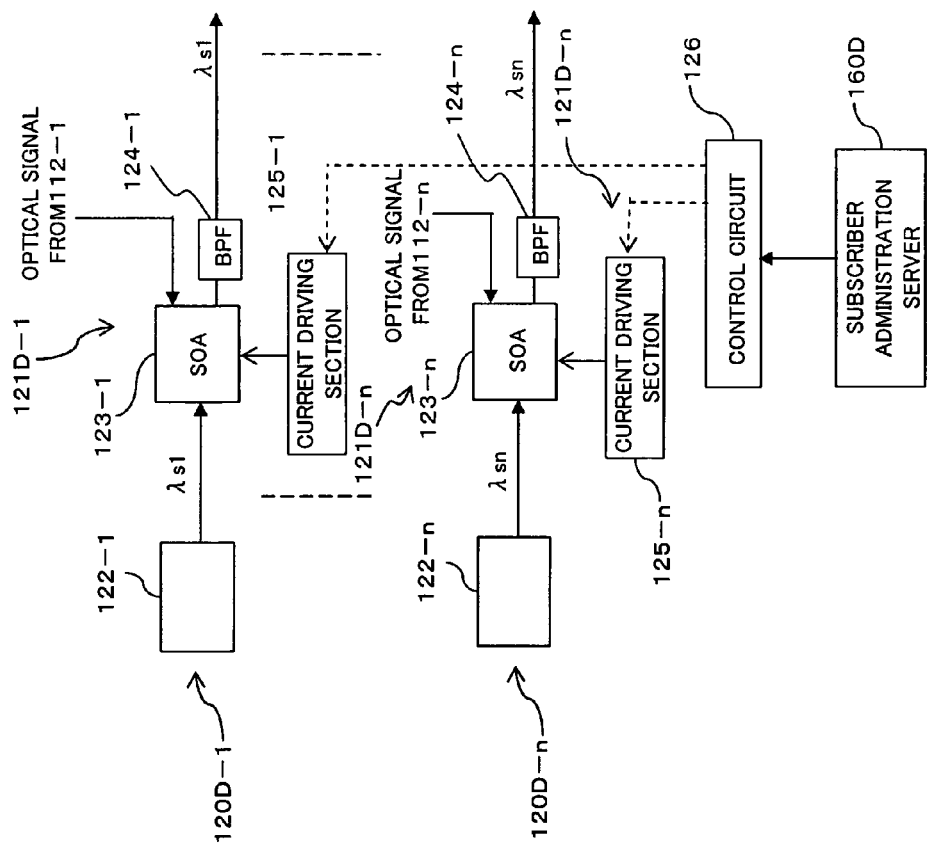
FIG. 9 is a block diagram showing a main portion of a central station in the fourth embodiment of the present invention.

Here, while the wavelength conversion sections 120D-1 to 120D-n include conversion processing sections 121D-1 to 121D-n and light sources 122-1 to 122-n respectively, the conversion processing sections 121D-1 to 121D-n include the semiconductor optical amplifiers (SOAs) 123-1 to 123-n, band pass filters 124-1 to 124-n, and electric current driving sections 125-1 to 125-n, respectively, as shown in FIG. 9, and also include a control circuit 126 used in common in each wavelength conversion section 120D-1 to 120D-n.

Here, as shown in FIG. 2 described above, the semiconductor optical amplifiers 123-1 to 123-n, which are supplied with a bias current from electric current driving sections 126-1 to 126-n, convert the optical signal from the channel selectors 112-1 to 112-n into a signal having the wavelength of light from the light sources 122-1 to 122-n, respectively. Moreover, the bandpass filters 124-1 to 124-n are used for eliminating the noise component that is contained in the optical signal outputted from the semiconductor optical amplifiers 123-1 to 123-n, respectively.

Moreover, the control circuit 126, which is capable of individually controlling the bias current supplied in the above-described electric current driving sections 125-1 to 125-n, controls the bias current to the electric current driving sections 125-1 to 125-n in response to instructions from a subscriber administration server 160D.

Namely, the subscriber administration server 160D can control interuption/non-interuption of the optical signal outputted in the semiconductor optical amplifiers 123-1 to 123-n by on/off-controlling the bias current supplied from the control circuit 126 to each semiconductor optical amplifier 123-1 to 123-n.

For example, in the case where a delivery of the contents information to the user station 300-1 has to be stopped compulsorily at the central station 100D side, the subscriber administration server 160D is adapted to interrupt-control the above-described optical signal by OFF-controlling the bias current supplied to the semiconductor optical amplifier 123-1 in the wavelength conversion section 120-1 as required, so that the optical signal wavelength-converted into an optical signal having the wavelength $\lambda_{s1}$ may not be outputted to the WDM multiplexer 130.

With the above-described configuration, also in the contents information delivery system 1B concerning the fourth embodiment of the present invention, similarly to the case of the above-described first embodiment, the contents information is delivered by transmitting the optical signal from the central station 100D to the user stations 300-1 to 300-n via the transmission line 2, through the processes of the first step to the third step.

At this time, in the case where a supply of the delivery service to any user in the user stations 300-1 to 300-n is intended to be stopped temporarily, the subscriber administration server 160D controls the corresponding wavelength conversion sections 120D-1 to 120D-n, thereby to interrupt-control the optical signal to be outputted from the wavelength conversion sections 120D-1 to 120D-n, in the first step.

For example, in the case where a supply of the delivery service to a user of the user station 300-1, who is delinquent in payment for the delivery service from the communication common carrier administrating the central station 100D, is intended to be stopped temporarily, the subscriber administration server 160D outputs a control instruction to the control circuit 126 the optical signal, thereby to off-control the bias current supplied to the semiconductor optical amplifier 123-1 from the electric current driving section 125-1 in the control circuit 126, and to interrupt-control the optical signal to be outputted in the semiconductor optical amplifier 123-1.

In this way, according to the fourth embodiment of the present invention, by wavelength-multiplex-transmitting the optical signal having mutually different wavelengths each assigned for each user station 300-1 to 300-n in advance, through the first to third step, there is the same advantage as in the case of the above-described first embodiment, and additionally there is an advantage that the supply of the delivery service to the user stations 300-1 to 300-n can be stopped temporarily as required because the interruption/non-interruption can be controlled of the outputting of the optical signal, to which the wavelength is assigned, in the first step.

In addition, in the above-described first embodiment, the function to control the interruption/non-interruption of the outputting of an optical signal to which the wavelength is assigned corresponding to the prescribed user stations 300-1 to 300-n, which is applied to the central station 100 of the contents delivery system 1 concerning the first embodiment, can be applied also to the central stations 100A and 100B of the contents delivery systems 1A and 1B of the second and the third embodiments in the same way.

(d1) Description of a Modification of the Fourth Embodiment

Figure 10:
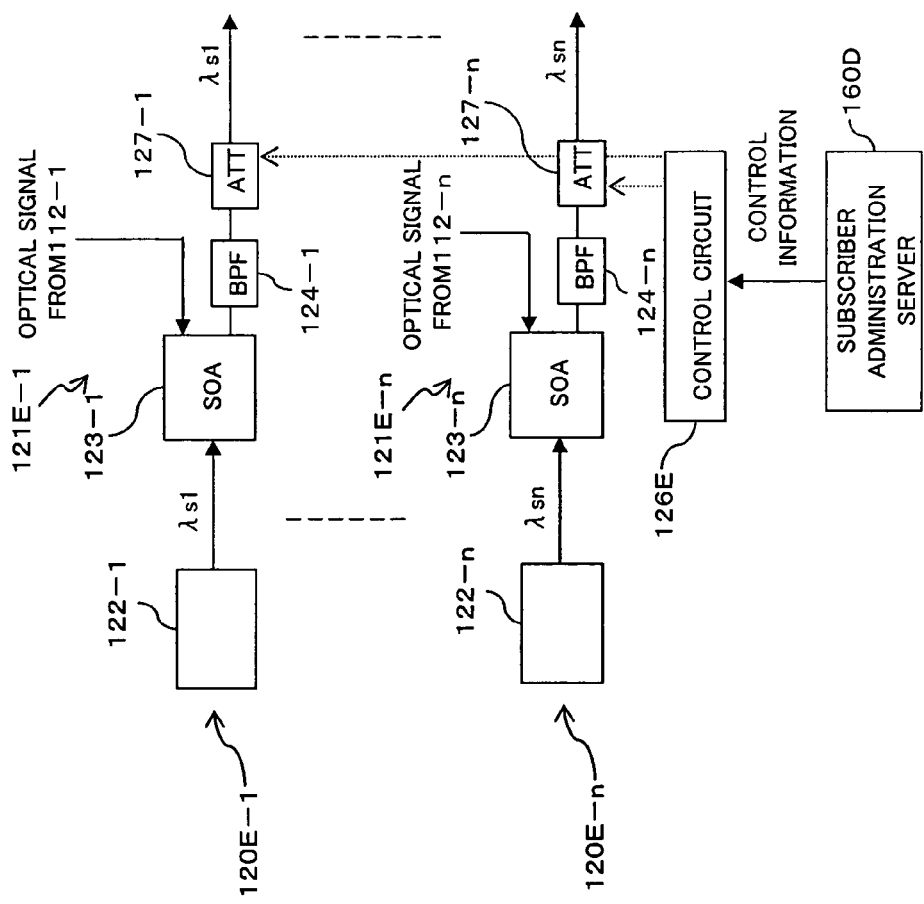
FIG. 10 is a view showing a modification of the contents delivery system concerning the fourth embodiment of the present invention.

FIG. 10 is a view showing a modification of the contents delivery system 1D concerning the fourth embodiment of the present invention. The central station 100D concerning this modification of the fourth embodiment includes wavelength conversion sections 120E-1 to 120E-n shown in FIG. 10 in place of the wavelength conversion sections 120D-1 to 120D-n. In addition, the configuration other than the wavelength conversion sections 120E-1 to 120E-n is basically the same as in the case of the fourth embodiment.

In the above described common control circuit 126 in the conversion processing sections 121D-1 to 121D-n shown in FIG. 9, the optical signal to be outputted in the semiconductor optical amplifiers 123-1 to 123-n is interrupt-controlled by controlling the bias current supplied from the electric current driving sections 125-1 to 125-n to the semiconductor optical-amplifiers 123-1 to 123-n in response to instructions from a subscriber administration server 160D, however according to the present invention, the contents information delivery system not limited to this, for example, the optical signal may be interrupt-controlled by constituting the conversion processing sections 121E-1 to 121E-n as shown in FIG. 10.

The conversion processing sections 121E-1 to 121E-n shown in FIG. 10 constitute the wavelength conversion sections 120E-1 to 120E-n, respectively, together with the light sources 122-1 to 122-n, similarly to the case of each embodiment described above.

Furthermore, the conversion processing sections 121E-1 to 121E-n respectively include the semiconductor optical amplifiers 123-1 to 123-n, to which a bias current is supplied in a fixed manner, the same bandpass filters (BPFs) 124-1 to 124-n as the ones shown in FIG. 9, attenuators (ATTs) 127-1 to 127-n, and also include a control circuit 126E which controls each attenuator 127-1 to 127-n.

The attenuators 127-1 to 127-n variably attenuate the level of the optical signal outputted from the bandpass filters 124-1 to 124-n in response to a control from the control circuit 126E which is used in common for each conversion processing section 121E-1 to 121E-n.

Moreover, the control circuit 126E, which is capable of individually controlling the bias current supplied in the above-described attenuators 127-1 to 127-n, controls the attenuators 127-1 to 127-n in response to instructions from the subscriber administration server 160D.

Namely, the subscriber administration server 160D can control interruption/non-interruption of the optical signal outputted in the semiconductor optical amplifiers 123-1 to 123-n by controlling attenuation of the optical signal by means of the attenuators 127-1 to 127-n under the control by the control circuit 126E.

For example, in the case where a delivery of the contents information to the user station 300-1 has to be stopped compulsorily at the central station 100E side, the subscriber administration server 160D is adapted to controls the bias current supplied to the semiconductor optical amplifier 123-1 in the wavelength conversion section 120-1 as required, thereby to interrupt-control the above-described optical signal, so that the optical signal wavelength-converted into an optical signal having the wavelength $\lambda_{s1}$ may not be outputted to the WDM multiplexer 130.

With the above-described configuration, also in the modification of the fourth embodiment of the present invention, in the case where a supply of the delivery service to any user in the user stations 300-1 to 300-n is intended to be stopped temporarily, the subscriber administration server 160D controls the corresponding wavelength conversion sections 120E-1 to 120E-n, thereby to interrupt-control the optical signal to be outputted from the wavelength conversion sections 120E-1 to 120E-n, in the first step.

For example, in the case where a supply of the delivery service to a user of the user station 300-1, who is delinquent in payment for the delivery service from the communication common carrier administrating the central station 100D, is intended to be stopped temporarily, the subscriber administration server 160D outputs a control instruction to the control circuit 126E, whereby, the control circuit 126E controls the attenuation of the optical signal in the attenuator 127-1, thereby to interrupt-control the optical signal to be outputted in the semiconductor optical amplifier 123-1.

In this way, also in the modification of the fourth embodiment of the present invention, there is the same advantage as in the case of the above-described first embodiment, and additionally there is an advantage that a supply of the delivery service to the user stations 300-1 to 300-n can be stopped temporarily as required because the interruption/non-interruption can be controlled of the outputting of an optical signal, to which the wavelength is assigned, in the first step.

In addition, also in the above-described modification, the wavelength conversion sections 120E-1 to 120E-n having the function to control the interruption/non-interruption of the outputting of the optical signal, to which the wavelength is assigned corresponding to the prescribed user stations 300-1 to 300-n, can be also applied to the central stations 100A and 100B in the contents delivery systems 1A and 1B of the second and the third embodiments.

(e) Description of a Fifth Embodiment of the Present Invention

Figure 11:
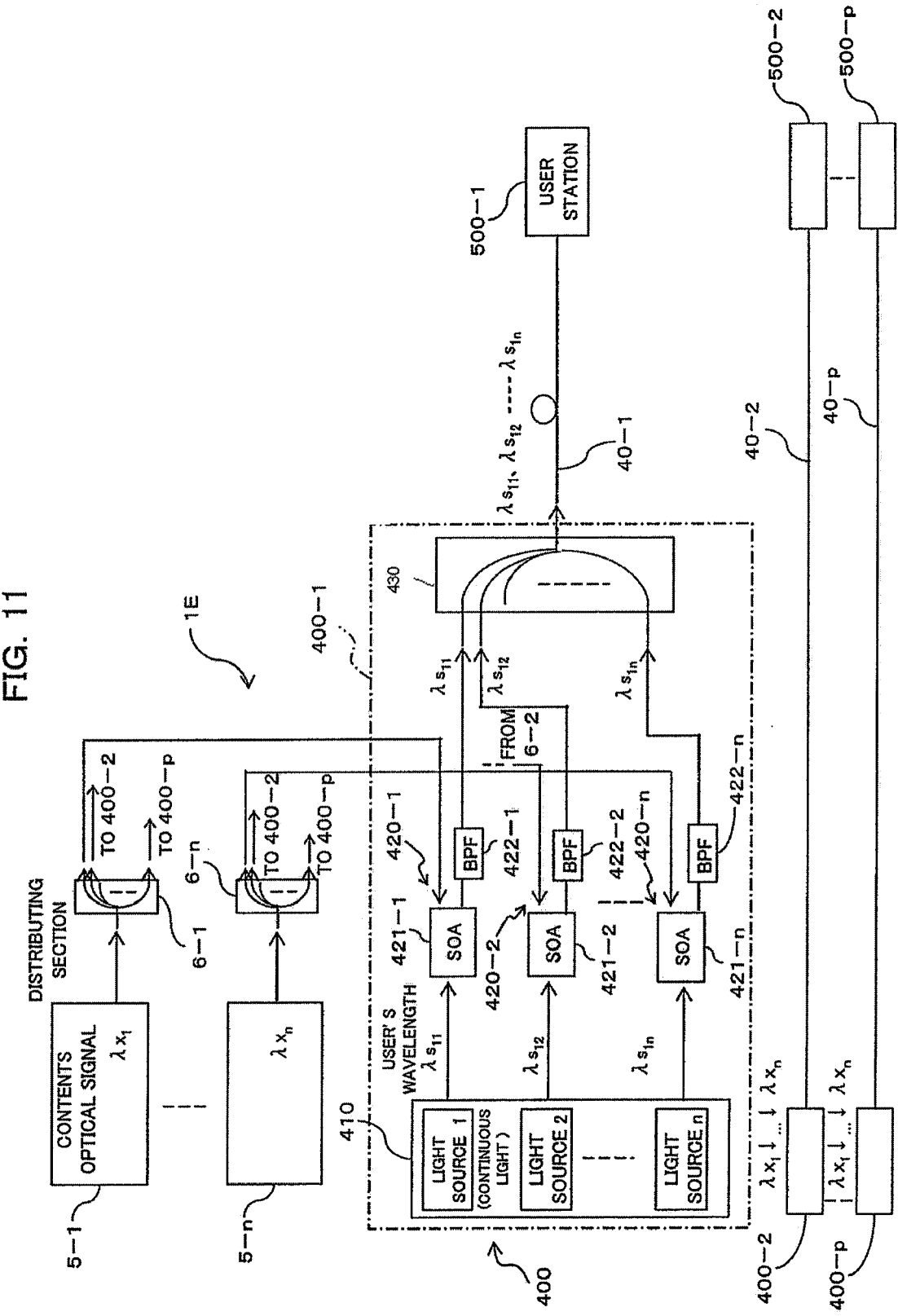
FIG. 11 is a block diagram showing a contents delivery system concerning a fifth embodiment of the present invention.

FIG. 11 is a block diagram showing a contents delivery system 1E concerning a fifth embodiment of the present invention. This contents delivery system 1E shown in FIG. 11, which is adapted to deliver a desired contents information, similarly to the case of the above-described first to the fourth embodiments, by transmitting the optical signal from a central station 400 to user stations 500-1 to 500-p via the transmission line, does not include the local equipment, and thus differs from that of the first to the fourth embodiments in the configurations of each central station 400 and each user station 500-1 to 500-p.

That is, in the contents delivery system 1E concerning the fifth embodiment, the central station 400 includes transmission sections 400-1 to 400-p for transmitting the wavelength-multiplexed optical signal to each user station 500-1 to 500-p. That is, the types of contents information of each transmission station 400-1 to 400-p are caused to correspond to the wavelength of the optical signal, thereby wavelength-multiplexing the optical signal, in which the contents information is modulated, to transmit.

Moreover, each user station 500-1 to 500-p can wavelength-multiplex the optical signal, which has propagated via the optical fiber 40, thereby to receive the above-described wavelength-multiplexed optical signal as the contents information for each type.

To this end, the central station 400 includes the transmission sections 400-1 to 400-p corresponding to the above-described user stations 500-1 to 500-p respectively, and also includes a plurality (n pieces, in this case) of distribution sections 6-1 to 6-n corresponding to the number of contents information supply sources 5-1 to 5-n. Here, the distributing sections 6-1 to 6-n is adapted to, for example, p-branch the content optical signal having mutually different kinds from the contents information supply sources 5-1 to 5-n, respectively, and to distribute it to each transmission section 400-1 to 400-p.

Moreover, the transmission sections 400-1 to 400-n include: a light source section 410 provided with light sources 410 (1 to n) capable of emitting light (continuous light) having user's wavelengths $\lambda_{s11}$ to $\lambda_{s1n}$ of which the number is established according to the number of the contents information to be transmitted; conversion processing sections 420-1 to 420-n which convert the wavelengths of the contents optical signals from the distributing sections 6-1 to 6-n into the wavelengths $\lambda_{s11}$ to $\lambda_{s1n}$ of light from the light sources 410 (1 to n), respectively; and a WDM multiplexer 430 which wavelength-multiplexes the contents optical signal, of which the wavelength is converted in the wavelength conversion sections 420-1 to 420-n.

Furthermore, the conversion processing sections 420-1 to 420-n include semiconductor optical amplifiers 421-1 to 421-n, and bandpass filters 422-1 to 422-n, respectively.

Here, the semiconductor optical amplifiers 421-1 to 421-n having basically the same configuration as the ones (refer to numerals 123-1 to 123-n) in the above-described first embodiment, respectively, into which the contents optical signal from the distributing sections 6-1 to 6-n, the light from the light sources 410 (1 to n), and the contents optical signal from the distributing sections 6-1 to 6-n are inputted, is adapted to convert the wavelength of the contents optical signal into the light wavelength from the light sources 410 (1 to n), and to output it. Moreover, the bandpass filters 422-1 to 422-n remove the noise component contained in the optical signal that is outputted from the semiconductor optical amplifiers 421-1 to 421-n.

In addition, although in FIG. 11, only the light source section 410, the wavelength conversion section 420, and the WDM multiplexer 430 in the transmission section 400-1 are illustrated, the transmission sections 400-2 to 400-n also have the same configuration according to the transmission section 400-1.

Accordingly, the optical signal wavelength-multiplexed by the WDM multiplexer 430 of each transmission section 400-1 to 400-n is transmitted via the optical fibers 40-1 to 40-n arranged for an exclusive use for user stations 500-1 to 500-n, respectively.

Figure 12:
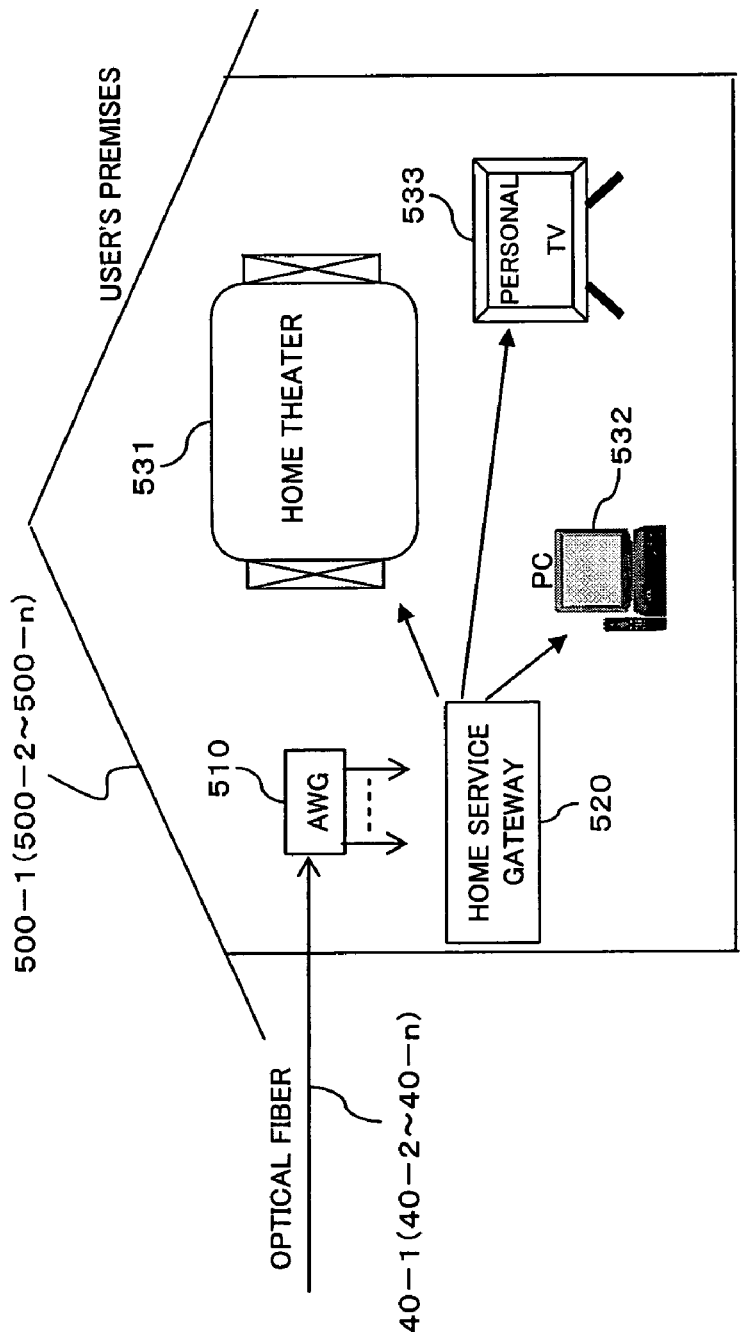
FIG. 12 is a block diagram for explaining a configuration of each user station in the fifth embodiment of the present invention.

Moreover, as shown in FIG. 12, each user station 500-1 to 500-n includes an array waveguide gratings (AWG) 510 and a home service gateway 520, respectively, and also includes a home theater 531, a personal computer 532, a personal television 533, or the like as the contents information reproducer.

Here, if the configuration of the user stations 500-1 to 500-n is described paying attention to the user station 500-1, the AWG 510 wavelength-separates the wavelength-multiplexed optical signal from the optical fiber 40-1, while the home service gateway 520 carries out an interfacing process of the wavelength-separated optical signal from the optical fiber 40-1, and the signal used for communication with the information appliances like the above-described contents information-reproducers.

Figure 13:
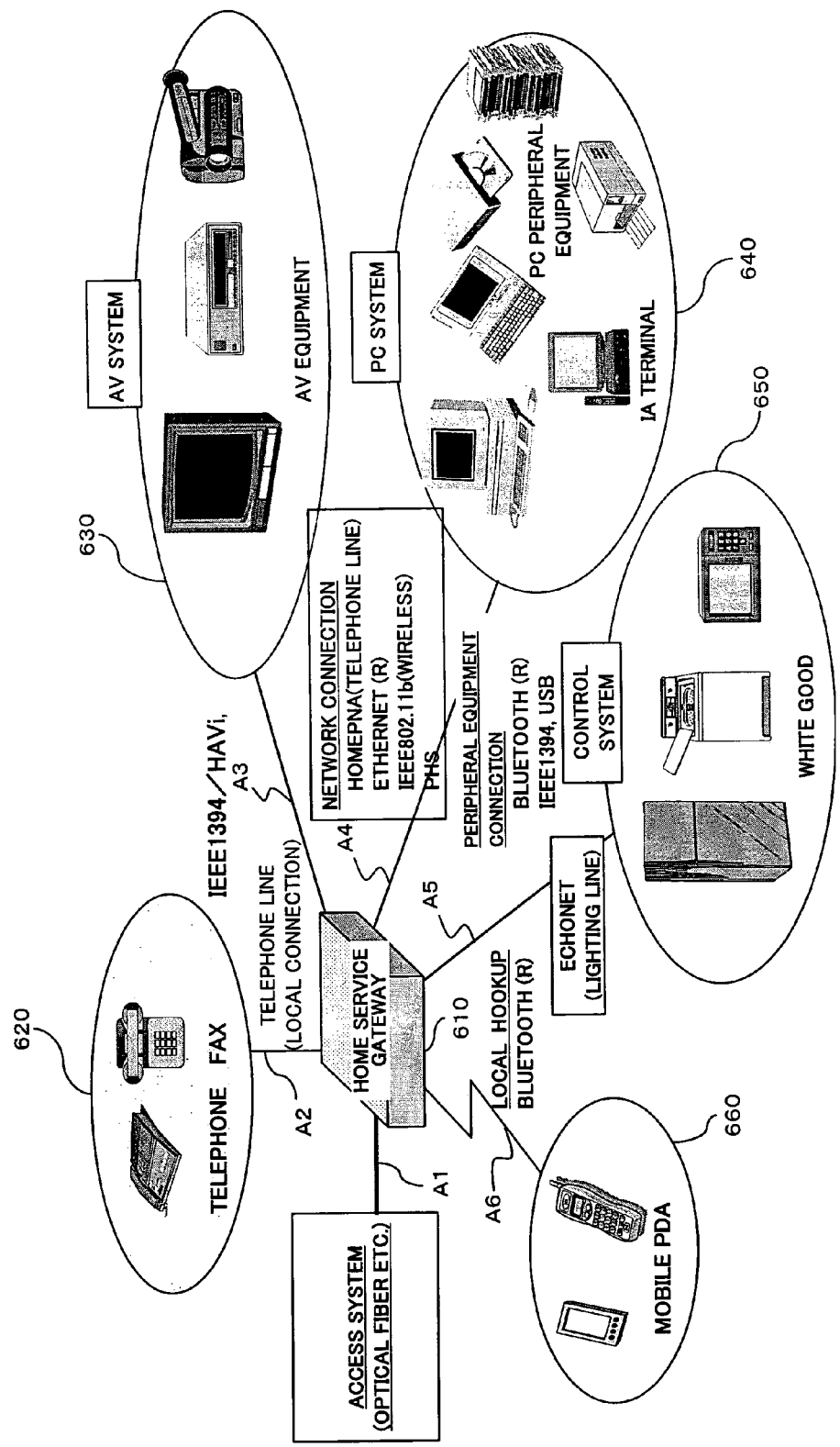
FIG. 13 is a view for explaining the function of a home service gateway applied in FIG. 12.

FIG. 13 is a view for explaining the function of a home service gateway 610 to be applied in FIG. 12 (refer to a numeral 520 in FIG. 12), and the home service gateway 610 shown in FIG. 13 interfaces the signal (refer to a symbol A1) of the access system, like the wavelength-separated optical signal from the optical fiber 40-1, with appliances 620 like a telephone and a FAX terminal by means of a local connection by a telephone line (refer to a symbol A2), and also interfaces with AV (Audio Visual) equipments 630 such as a television and a video, by means of IEEE (Institute of Electronic and Electronics Engineers) 1394/HAVi (refer to a symbol A3).

Likewise, the home service gateway 610 is adapted to make a network connection between the signal (refer to a symbol A1) of the above-described access system, and each of a personal computer, a peripheral equipment such as a printer, as well as the PC equipments 640 such as an IA terminal, by means of a HomePNA (R), an Ethernet (R), IEEE 802.11b (wireless), or an PHS (Personal Handyphone System), or the like, and to make a peripheral-equipment-connection by means of a Bluetooth (R), IEEE1394, or a USB (Universal Serial Bus) (refer to a symbol A4).

Furthermore, the home service gateway 610 is adapted to make a connection between the signal (refer to the symbol A1) of the above-described access system and each of the control-system equipments 650 such as a refrigerator and a washing machine by means of an ECHONET (R) (refer to a symbol A5), or to make a local-hook-up connection with equipments 660 such as a portable telephone or a PDA (Personal Digital Assistant) terminal by means of the Bluetooth (refer to a symbol A6).

Thereby, upon receipt of the wavelength-separated optical signal, the home service gateway 520 shown in FIG. 12 can deliver it as it is, or can deliver it by converting it into an electrical signal to various terminals as the home information appliances. For example, it is possible to deliver pictures of the newest movie or the like to the home theater 531 for a family to watch, pictures of a hobby or the like to the personal television 533, and video camera pictures of a grandchild living in a remote place to the personal computer 532.

With the above-described configuration, also in the contents delivery system 1E concerning the fifth embodiment of the present invention, paying attention to the case where a desired contents information is delivered from the central station 400 toward the user station 500-1 by transmitting the optical signal via the optical fiber 40-1 as the transmission line, the desired contents information is outputted as an optical signal having mutually different wavelengths $\lambda_{s11}$ to $\lambda_{s1n}$ each assigned for each contents information in advance, as a first step, in the conversion processing sections 420-1 to 420-n of the central station 400 (a first step).

Next, the optical signal outputted in the first step is wavelength-multiplexed by the WDM multiplexer 430, and transmitted via the optical fiber 40-1 as the transmission line (a second step). Furthermore, the user station 500-1 receives after having wavelength-separated the wavelength-multiplexed optical signal by the AWG 510 (a third step).

Moreover, in the user station 500-1, the AWG 510 wavelength-separates the wavelength-multiplexed optical signal and the home service gateway 520 delivers and thus the contents information to various kinds of home information appliances corresponding to separated wavelength. In addition, the contents information is delivered from each transmission section 400-2 to 400-n via the optical fibers 40-2 to 40-n to the other user stations 500-2 to 500-n as well, in the same way.

In this way, according to the fifth embodiment of the present invention, by wavelength-multiplex-transmitting the optical signal having mutually different wavelengths each assigned for each contents information in advance, through the first to third steps, it is possible to deliver as a large-capacity signal the contents information corresponding to the types of the home information appliances, while the transmission line having a simple configuration is employed, and additionally there is an advantage that even contents delivery of which the required bandwidths differ greatly can be done with a common (or unique) network configuration.

Furthermore, in the above-described each user station, as a component having the function to receive the optical signal wavelength-separated in the AWG 510 and to interface with the signal to various home information appliances, the home service gateway is used, however, according to the present invention, for the same function, a residential gateway may be used for configuration.

Figure 14:
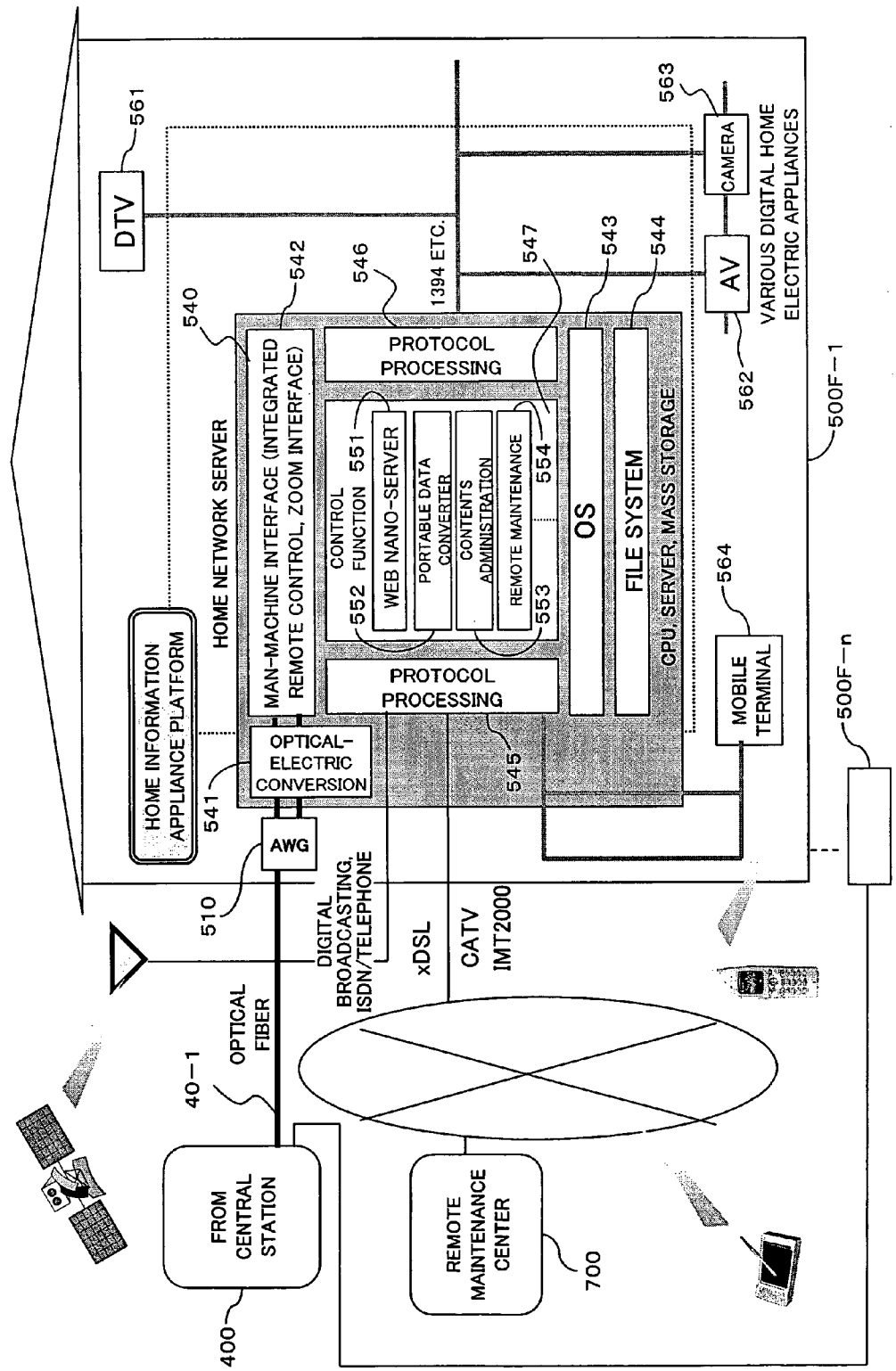
FIG. 14 is a block diagram showing a first modification of the fifth embodiment of the present invention.

(e1) Description of a First Modification of the Fifth Embodiment of the Present Invention FIG. 14 is a block diagram showing a first modification of the fifth embodiment of the present invention. The one shown in FIG. 14 includes user stations 500F-1 to 500F-n having a configuration different from that of the user stations 500-1 to 500-n in the above-described fifth embodiment, and the configuration of the central station 400 is basically the same as in the case of the above-described fifth embodiment.

That is, as shown in FIG. 14, the stations 500F-1 to 500F-n include the array waveguide gratings (AWG) 510 and a home network server 540, respectively, and also include digital home electric appliances such as a digital television (DTV) 561, a camera 563, an AV equipments 562 and a mobile terminal 564 as the contents information reproducer, respectively. In addition, in FIG. 14, attention is paid to the configuration of the user station 500F-1 for illustration.

Here, if the configuration of the user stations 500F-1 to 500F-n are described paying attention to the user station 500-1, the AWG 510 wavelength-separates the wavelength-multiplexed optical signal from the optical fiber 40-1, and the home network server 540 carries out an interfacing process of the wavelength-separated optical signal from the optical fiber 40-1, and the signal used for communication with the home information appliances like the above-described contents information reproducer.

Furthermore, in terms of hardware, the home network server 540 includes an optical-electric converter 541, and man-machine interfaces 542 such as an integrated remote controller and a zoom interface as well as an interface section for making connections with a CPU (Central Processor Unit) and a mass storage, which are not illustrated, a telephone and a cable television, a portable telephone, and IEEE appliances.

Moreover, in terms of software, this home network server 540 includes protocol processing sections 545 and 546 and a control function section 547 that are capable of operating under an OS (Operating System) 543 or a file system 544.

Here, the protocol processing section 545 carries out a protocol processing for receiving a digital broadcasting from a satellite via an ISDN (Integrated Services Digital Network; R) or a telephone line, a protocol processing for Communication with a remote maintenance center 700 connected via an xDSL, a cable television, a network of IMT2000, and a protocol processing for a local connection to the mobile terminal 564.

Furthermore, the protocol processing section 546 carries out a protocol processing for communication among the digital televisions 561, the AV equipments 562, and the cameras 563 which are connected with IEEE1394. In addition, a home-information-appliance platform is configured of the above-described home network server 540 and the network for making connections with the IEEE equipments.

Moreover, the control-function section 547 includes a Web nano-server 551, a portable data converter 552, a contents-administration section 553, and a remote maintenance section 554.

Thereby, in the home network server 540, upon receipt of the wavelength-separated optical signal, the contents information can be delivered to various terminals 561-564 as the home information appliances similarly to the case of the home service Gateway 520 of the above-described fifth embodiment.

With the above-described configuration, also in the contents delivery system concerning the first modification of the fifth embodiment of the present invention shown in FIG. 14, if paying attention to the case where a desired contents information is delivered from the central station 400 toward the user station 500F-1 by transmitting the optical signal via the optical fiber 40-1 as the transmission line, the desired contents information is outputted as an optical signal having mutually different wavelengths $\lambda_{s11}$ to $\lambda_{s1n}$ each assigned for each contents information in advance, as the first step, in the conversion processing sections 420-1 to 420-n of the central station 400 (refer to FIG. 11), (a first step).

Next, the optical signal outputted in the first step is wavelength-multiplexed by the WDM multiplexer 430, and transmitted via the optical fiber 40-1 as the transmission line (a second step). Furthermore, the user station 500F-1 receives after having wavelength-separated the wavelength-multiplexed optical signal by the AWG 510 (a third step).

Moreover, in the user station 500F-1, the AWG 510 wavelength-separates the wavelength-multiplexed optical signal from the optical fiber 40-1, and causes it to correspond to the wavelength wavelength-separated via the home network server 540, and thus the contents information is delivered to the various kinds of terminals 561-564. In addition, the contents information is delivered from each transmission section 400-2 to 400-n via the optical fibers 40-2 to 40-n to the other user stations 500F-2 to 500F-n as well, in the same way.

In this way, also in the first modification of the fifth embodiment of the present invention, by wavelength-multiplex-transmitting the optical signal having mutually different wavelengths each assigned for each contents information in advance, through the first to third steps, it is possible to deliver as a large-capacity signal the contents information corresponding to the types of the home information appliances while the transmission line having a simple configuration is employed, similarly to the case of the above-described fifth embodiment. Additionally, there is an advantage that even contents delivery of which the required bandwidths differ greatly can be done with a common (or unique) network configuration.

Figure 15:
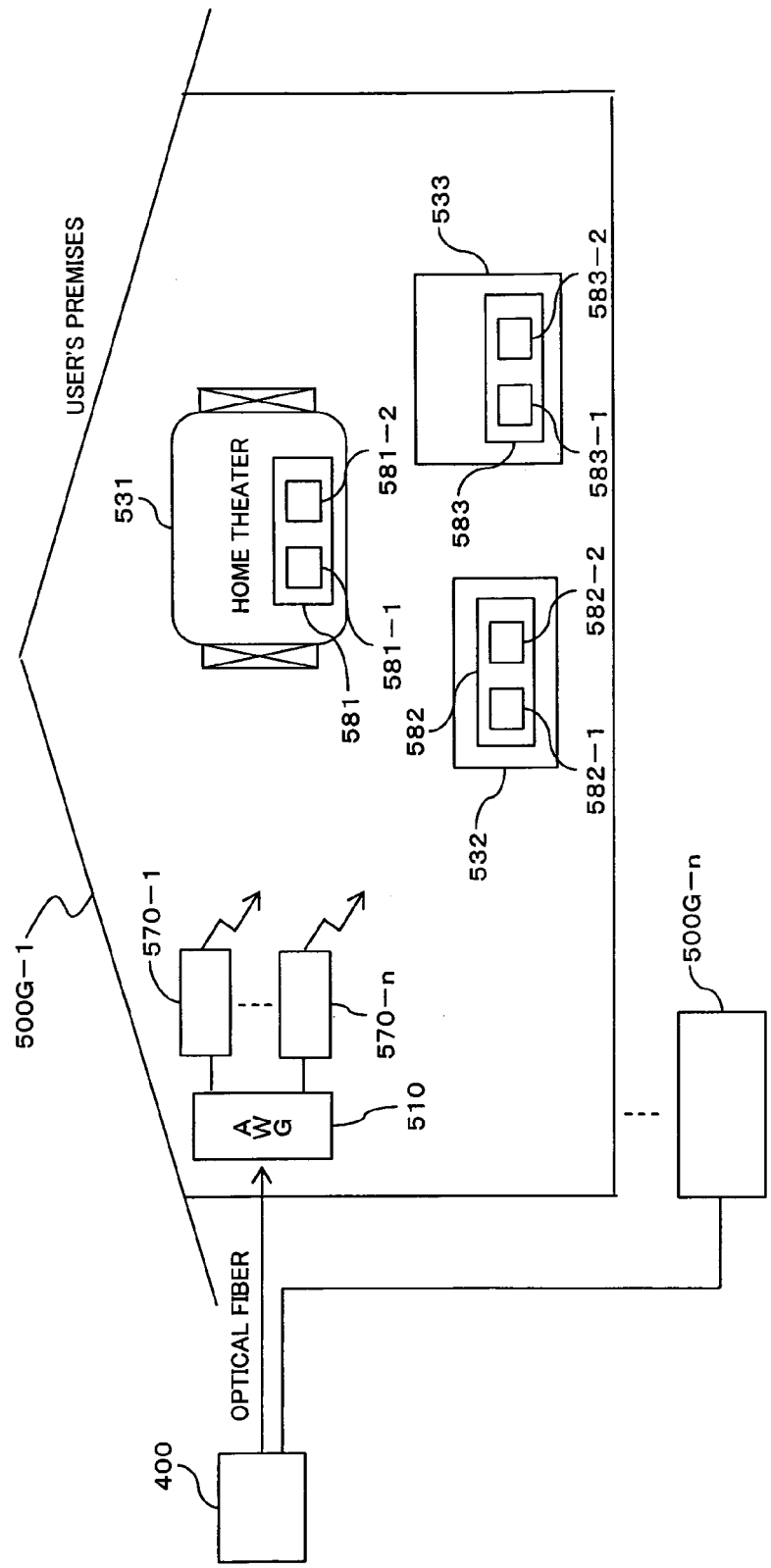
FIG. 15 is a block diagram showing a second modification of the fifth embodiment of the present invention.

(e2) Description of a Second Modification of the Fifth Embodiment of the Present Invention FIG. 15 is a block diagram showing a second modification of the fifth embodiment of the present invention. The one shown in FIG. 15 includes user stations 500G-1 to 500G-n having a configuration different from that of the user stations 500-1 to 500-n in the above-described fifth embodiment, and the configuration of the central station 400 is basically the same as in the case of the above-described fifth embodiment.

That is, as shown in FIG. 15, the user stations 500G-1 to 500G-n include the array waveguide gratings (AWG) 510 and optical/microwave conversion modules 570-1 to 570-n, respectively, and also include the home theater 531, the personal computer 532, and the personal television 533 as the contents information reproducer, respectively. In addition, in FIG. 15 attention is paid to the configuration of the user station 500G-1 for illustration.

Here, if the configuration of the user stations 500G-1 to 500G-n is described paying attention to the user station 500-1, the AWG 510 wavelength-separates the wavelength-multiplexed optical signal from the optical fiber 40-1, while the optical/microwave conversion modules 570-1 to 570-n carry out an interfacing process of the wavelength-separated optical signal from the optical fiber 40-1, and the signal used for communication with the home information appliances like the above-described contents information reproducer.

Specifically, each of the n optical/microwave conversion modules 570-1 to 570-n is adapted to convert the wavelength-separated optical signal in the AWG 510 into a microwave having mutually different frequencies by individually sharing the load for conversion, thereby to transmit it as an electric wave signal. In other words, the optical/microwave conversion modules 570-1 to 570-n convert the contents information into a microwave having mutually different frequency channels according to the types of the contents information modulated into each wavelength-separated optical signal, thereby to transmit it as an electric wave signal.

Here, each of the optical/microwave conversion modules 570-1 to 570-n, which is a device for integrating a monocarrier photodiode with an antenna and for receiving the optical signal, thereby to emit a microwave into space with no power supply, can emit, for example, a microwave of 1 mW or more in a 5.8 GHz band to transmit it approximately 30 meters. In addition, the size of the optical/microwave conversion modules 570-1 to 570-n is as extremely small as 50 mm×20 mm×10 mm in length×height×depth.

Moreover, the above-described home theater 531, personal computer 532, and personal television 533 respectively include radio wave receivers 581 to 583 for receiving n kinds of radio wave signals having the frequency channels sent from the optical/microwave conversion modules 570-1 to 570-n to convert them into the signals for reproduction.

Furthermore, the radio wave receivers 581 to 583 of the home theater 531, the personal computer 532, and the personal television 533 include receiver sections 581-1 to 583-1 for receiving the radio wave signal, respectively, and also include channel selecting sections 581-2 to 583-2 for selecting the contents information on the desired frequency channel to be reproduced from among the n kinds of received radio wave signals.

Thereby, in the user stations 500G-1 to 500G-n, the home theater 531, the personal computer 532, and the personal television 533 each can selectively reproduce the desired contents information from among the plural types of the contents information via the channel selecting sections 581-2 to 583-2 of the radio wave receivers 581 to 583.

With the above-described configuration, also in the contents delivery system concerning the second modification of the fifth embodiment of the present invention shown in FIG. 15, if paying attention to the case where the desired contents information is delivered from the central station 400 to the user station 500G-1 by transmitting the optical signal via the optical fiber 40-1 as the transmission line, the desired contents information is outputted as an optical signal having mutually different wavelengths $\lambda_{s11}$ to $\lambda_{s1n}$ each assigned for each contents information in advance, as a first step, in the conversion processing sections 420-1 to 420-n of the central station 400 (refer to FIG. 11), (a first step).

Next, the optical signal outputted in the first step is wavelength-multiplexed by the WDM multiplexer 430, and is transmitted via the optical fiber 40-1 as the transmission line (a second step). Furthermore, the user station 500G-1 receives after having wavelength-separated the wavelength-multiplexed optical signal by the AWG 510 (a third step).

That is, in the user station 500G-1, the AWG 510 wavelength-separates the wavelength-multiplexed optical signal from the optical fiber 40-1, while the n optical/microwave conversion modules 570-1 to 570-n each convert the wavelength-separated optical signal into a microwave signal, thereby to transmit it.

The home theater 531, the personal computer 532, and the personal television 533 of the user station 500G-1 receive the radio wave signal transmitted from the optical/microwave conversion modules 570-1 to 570-n in receiver sections 581-1 to 583-1 of the radio wave receivers 581 to 583, respectively, thereby to selectively reproduce the desired contents information form among plural types of the contents information via channel selecting sections 581-2 to 583-2.

In addition, the contents information is delivered from each transmission section 400-2 to 400-n via the optical fibers 40-2 to 40-n to the other user stations 500G-2 to 500G-n as well, in the same way.

In this way, also in the second modification of the fifth embodiment of the present invention, by wavelength-multiplex-transmitting the optical signal having mutually different wavelengths each assigned for each contents information in advance, through the first to third steps, it is possible to deliver the desired contents information as a large-capacity signal while the transmission line having a simple configuration is employed, similarly to the above-described fifth embodiment. Additionally, there is an advantage that even contents delivery of which the required bandwidths differ greatly can be done with a common (or unique) network configuration.

Moreover, there is also an advantage that the serviceability to the user can be improved because the optical/microwave conversion modules 570-1 to 570-n and the radio wave receivers 581 to 583 can selectively reproduce the desired contents information from among a plurality of kinds of the contents information.

In addition, in the embodiments shown in FIG. 11, FIG. 14, or FIG. 15 described above, the n pieces of user's wavelengths to be set in each transmission section 400-1 to 400-n can be set so as to differ mutually. In this case, the optical fibers 40-1 to 40-n as the transmission line are not configured for an exclusive use corresponding to each user station 500-1 to 500-n (500F-1 to 500F-n, or 500G-1 to 500G-n), and instead, by providing the local equipment (refer to a numeral 200) and the second optical fibers (refer to 20-1 to 20-n) on the transmission line in accordance with the case of the above-described first embodiment, it is also possible to transmit, as the wavelength-multiplexed optical signal, the wavelength-multiplexed optical signal for each user station 500-1 to 500-n (500F-1 to 500F-n, or 500G-1 to 500G-n) via the single-conductor optical fiber.

(f) Others

In the contents delivery systems 1, and 1A, 1B and 1D concerning the first to fourth embodiments, the user station side transmits the control information such as the contents-selection information, and then the central station outputs the optical signal containing the contents information in a wavelength assigned to each user station, based on the control information from the user station. However according to the present invention, there is an advantage that configuring a system, in which even if the control information such as the contents-selection information from the user station side according to the control information is not transmitted, at least the processes through the first to third steps are carried out, makes it possible to wavelength-multiplex-transmit the optical signal having mutually different wavelengths each assigned for each user station in advance, and to deliver a large-capacity signal while the delivery node having a simple configuration is employed, thus enabling even the contents delivery of which the required bandwidths differ greatly to be done with a common (one) network configuration.

Moreover, in the contents delivery systems 1, 1A, 1B, 1D and 1E concerning the above-described each embodiment, one type of the contents information is modulated for each optical signal having the wavelength assigned for each user station, however according to the present invention, the contents delivery system is not limited to this, and may be configured so as to logic-multiplex a plurality of types of contents information for each optical signal having the assigned wavelength, based on the other multiplexing protocol.

Figure 16:
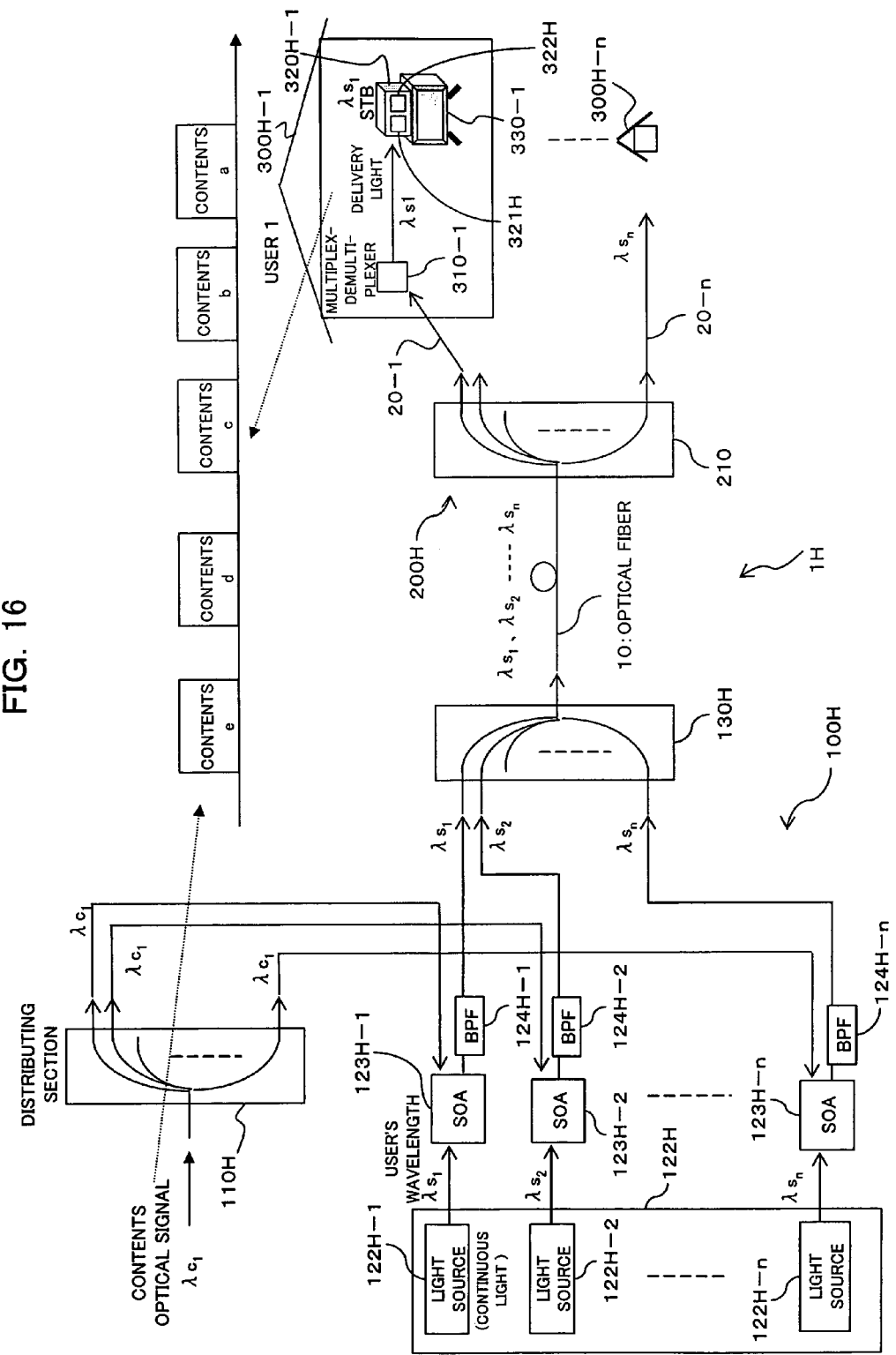
FIG. 16 and FIG. 17 are block diagrams showing other embodiments of the present invention.

For example, a contents delivery system 1H shown in FIG. 16 is configured so that the above-described logic-multiplexed optical signal can be transceived (transmitted/received) between a central station 100H and each of user stations 300H-1 to 300H-n via a local equipment 200H.

Here, the central station 100H includes a distributing section 110H, a light source section 122H, conversion processing sections 121H-1 to 121H-n, and a WDM multiplexer 130H, while the local equipment 200H includes the AWG for delivery 210, and the user stations 300H-1 to 300H-n include multiplex-demultiplexers 310-1 to 310-n, STBs 320H-1 to 320H-n, and the televisions 330-1 to 330-n as the contents information reproducer. In addition, in FIG. 16, attention is paid to the user station 300H-1 for illustration.

That is, the distributing section 110H distributes the optical signal (wavelength $\lambda_{c1}$), in which a plurality of types of contents information are logic-multiplexed based on a known multiplexing protocol, according to the number of the user stations 300H-1 to 300H-n, and the light source section 410H includes the light sources 122H-1 to 122H-n capable of emitting light (continuous light) having the user's wavelengths $\lambda_{s11}$ to $\lambda_{s1n}$ each established for each user station 300H-1 to 300H-n.

Furthermore, the conversion processing sections 121H-1 to 121H-n, which convert the wavelength of the contents optical signal n-distributed in the distributing section 110H into wavelengths $\lambda_{s11}$ to $\lambda_{s1n}$ of the light from the light sources 122H-1 to 122H-n, respectively, include SOAs 123H-1 to 123H-n, and bandpass filters (BPF) 124H-1 to 124H-n. Moreover, the WDM multiplexer 130H wavelength-multiplexes the optical signal wavelength-converted in the conversion processing sections 121H-1 to 121H-n, and transmits it via the optical fiber 10.

Moreover, the AWG used for delivery 210 of the local equipment 200H is adapted to wavelength-separate the wavelength-multiplexed optical signal transmitted via the optical fiber 10 similarly to the case of the above-described first embodiment, and to output the wavelength-separated optical signal via the optical fibers 20-1 to 20-n in accordance with the wavelength allocation to the user stations 300H-1 to 300H-n.

Moreover, the multiplex-demultiplexers 310-1 to 310-n of the user stations 300H-1 to 300H-n receive the optical signal wavelength-separated in the AWG for delivery 210, while the STBs 320H-1 to 320H-n include a logic-separating section 321H which separates a plurality of types of the contents information (five types, a contents information 'a' to a contents information 'e', in FIG. 16) logic-multiplexed with the above-described multiplexing protocol into each contents information, and also includes the function as a contents information selecting section 322H for selecting the desired contents information to be reproduced from among the separated contents information.

Such a configuration makes it possible to transmit the optical signal, in which a plurality of types of the contents information are logic-multiplexed, by means of the optical signal having wavelengths $\lambda_{s1}$ to $\lambda_{sn}$ each assigned for each user station 300H-1 to 300H-n from the central station 100H, in the first and the second steps, and also to receive the optical signal having the wavelength assigned to itself in each user station 300H-1 to 300H-n from the local equipment 200H, in the third step.

At this time, the logic-separating section 321H of the STBs 320H-1 to 320H-n converts the optical signal from the optical multiplex-demultiplexers 310H-1 to 310H-n into an electrical signal, and also logic-separates the logic-multiplexed contents information to pass the contents information selected in the contents information selecting section 322H to the television 330H, thereby allowing the contents information to be reproduced via the television 330H.

Accordingly, also in the system 1H shown in FIG. 16, it is possible to wavelength-multiplex-transmit the optical signal having mutually different wavelengths each assigned for each user station 300H-1 to 300H-n in advance, thereby allowing a large-capacity signal to be delivered while the delivery node having a simple configuration is employed. Consequently, there is also an advantage that application modes of the service in users can be expanded because a plurality of types of the contents information are logic-multiplexed based on the multiplexing protocol for each optical signal having the assigned wavelength.

In addition, needless to say, it is also possible that the television 330 as the contents information reproducer shown in FIG. 16 has the function like the above-described STB 320H integrally.

Moreover, in the contents delivery systems 1, 1A and 1D concerning the above-described first to fourth embodiments, the control information such as the contents-selection information is transmitted to the central station from the user station side, however, according to the present invention, the above-described control information may be transmitted also to other IP (Internet Protocol) networks and other service providers (XSP), in addition to the central station.

Figure 17:
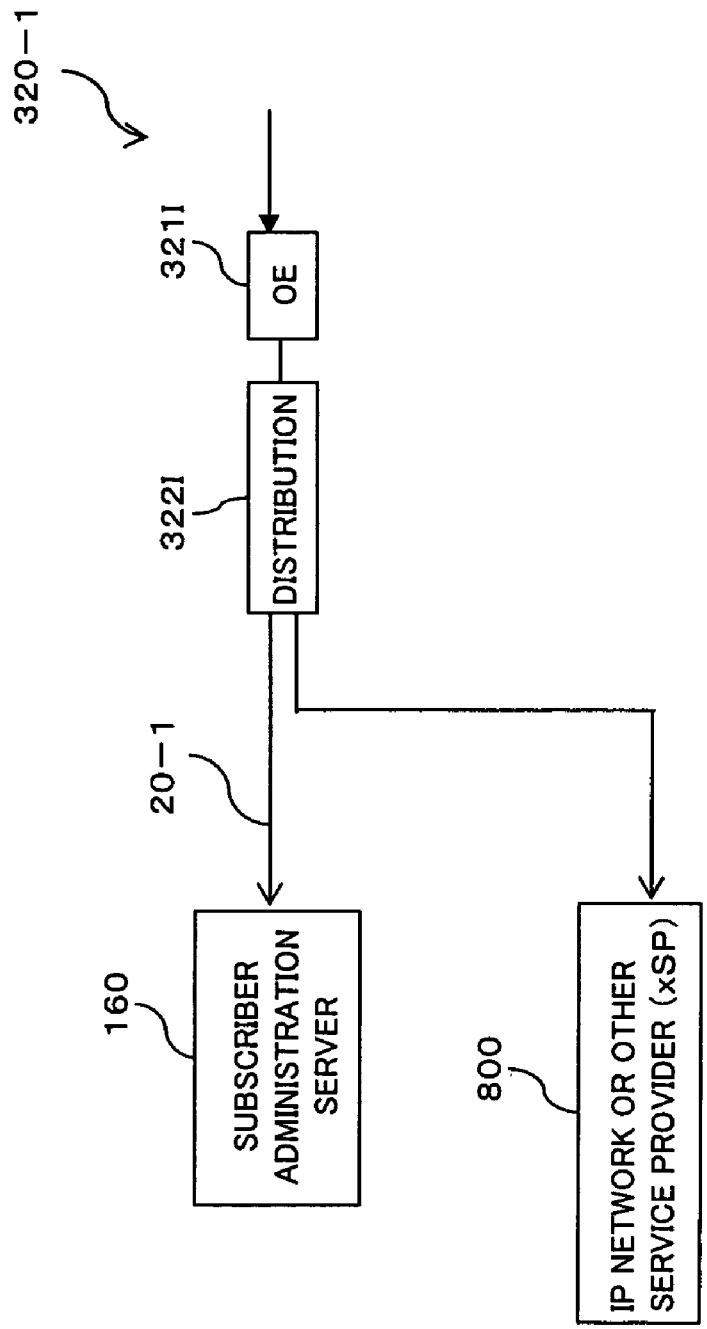

For example, as shown in FIG. 17, an optical-electric converter (OE) 321I and a distributor 322I may be provided in the STB 320-1 of the user station 300-1 in the first embodiment, and the distributing section 322I may distribute the control information converted into an optical signal in the optical-electric converter 321I into two, may output one of them to the subscriber administration server 160 via the third optical fiber 30, and also may transmit the other to the IP network or other service provider 800 via a fourth optical fiber 40.

Moreover, regardless of the embodiments described above, various modifications can be made without departing from the spirit and scope of the present invention.

Furthermore, if each embodiment of the present invention is disclosed, it is possible for those skilled in the art to manufacture these modifications.

As mentioned above, a delivery method and delivery system of a contents information as well as a central station thereof according to the present invention are useful in providing a service for contents delivery by means of an optical access system, and are especially suitable for making a configuration so as to be able to cope with a super-large capacity.

What is claimed is:

1. A contents information delivery method of delivering a desired contents information to at least one of a plurality of user stations via a central station, the contents information delivery method comprising the steps of:

in the central station,
receiving a plurality of contents-included optical signals each having a first wavelength different from each other, each said contents-included optical signal being transmitted from one of a plurality of contents sources,
generating a set of the received plurality of contents-included optical signals for each of the user stations,
selecting one of the plurality of contents-included optical signals from the set for each of at least one of the plurality of user stations, respectively;
performing interruption/non-interruption control of the contents-included optical signal selected for each of at least one of the plurality of user stations;
converting the first wavelength of the contents-included optical signal to be passed through thereof by the interruption/non-interruption control into a second wavelength assigned for each of the user stations, respectively,
wavelength multiplexing the wavelength-converted contents-included optical signals, and
outputting and transmitting the wavelength multiplexed optical signal via a transmission line; and
in each of the user stations,
receiving an optical signal having the second wavelength assigned to one of the user stations from among wavelengths of said wavelength multiplexed optical signal.

2. The contents information delivery method according to claim 1, further comprising a step of wavelength-separating said wavelength multiplexed optical signal in local equipment on said transmission line.

3. The contents information delivery method according to claim 2, wherein
said wavelength multiplexed optical signal is transmitted via a first optical fiber constituting the transmission line, and wherein
in said wavelength-separating step, the local equipment wavelength-separates the multiplexed optical signal from the first optical fiber, and also outputs said wavelength-separated optical signal to a second optical fiber leading to a user station to which the wavelength of the wavelength-separated optical signal is assigned.

4. The contents information delivery method according to claim 3, further comprising:
a control information outputting step in which each user station outputs control information for delivering said contents information as an optical control signal having a wavelength, which differs for each user station and also differs from the wavelength assigned for the contents information delivery to each user station, via said second optical fiber to the local equipment; and
a control information multiplexing step of wavelength-multiplexing the control signal inputted from each user station via the second optical fiber in the local equipment, and of transmitting the wavelength multiplexed control signal to the central station via a third optical fiber different from said first optical fiber and second optical fiber, wherein
said central station outputs the wavelength multiplexed optical signal containing said contents information in wavelengths assigned to each user station, based on the wavelength multiplexed control signal from the local equipment.

5. The contents information delivery method according to claim 3, further comprising:
a control information outputting step in which each user station outputs control information for delivering of said contents information as an optical control signal having a wavelength, which differs for each user station and also differs from the wavelength assigned for the contents information delivery to each user station, via the second optical fiber to the local equipment; and
a control information multiplexing step of wavelength-multiplexing the control signal inputted from each user station via the second optical fiber in the local equipment, and of transmitting the wavelength multiplexed control signal to the central station via the first optical fiber, wherein
said central station outputs the wavelength multiplexed optical signal containing said contents information in wavelengths assigned to each user station, based on the wavelength multiplexed control signal from the local equipment.

6. The contents information delivery method according to claim 2, wherein in the wavelength-separating step, said wavelength multiplexed optical signal is wavelength-separated in a passive element in the local equipment.

7. The contents information delivery method according to claim 6, wherein in the wavelength-separating step, said wavelength multiplexed optical signal is wavelength-separated in an array waveguide grid as the passive element in said local equipment.

8. The contents information delivery method according to claim 1, wherein in the wavelength conversion step, a semiconductor optical amplifier converts the wavelength of the contents-included optical signal inputted therein into a wavelength of a light from a light source using a cross gain modulation characteristic of the semiconductor optical amplifier itself, which the wavelength of the light is the wavelength assigned for the specific user station.

9. The contents information delivery method according to claim 1, further comprising a control information transmitting step of transmitting, from each user station to the central station, control information for delivering said contents information to said each user station.

10. The contents information delivery method according to claim 9, wherein in the control information transmitting step, each user station transmits the control information to the central station via other existing lines.

11. The contents information delivery method according to claim 9, wherein the control information is contents-selection information that the user station selects to receive.

12. The contents information delivery method according to claim 1, wherein the central station performs administration of subscriber information in each of the plurality of user stations upon receipt of control information from corresponding user station, and performs interruption/non-interruption control of the contents-included optical signal selected for each of at least one of the plurality of user stations based on the administration.

13. A contents information delivery system for delivering contents information from a plurality of contents sources to at least one of a plurality of user stations via a central station, wherein said central station comprises:
 a receiving section that receives a plurality of contents-included optical signals each having a first wavelength different from each other, each said contents-included optical signal being transmitted from one of a plurality of contents sources,
 a generating section that generates a set of the received plurality of contents-included optical signals for each of the user stations,
 a selecting section that selects one of the plurality of contents-included optical signals from the set for each of at least one of the plurality of user stations, respectively, and performs interruption/non-interruption control of the contents-included optical signal selected for each of at least one of the plurality of user stations;
 a converting section that converts the first wavelength of the contents-included optical signal to be passed through thereof by the interruption/non-interruption control into a second wavelength assigned for each of the user stations, respectively,
 a multiplexing section that wavelength multiplexes the wavelength-converted contents-included optical signals, and
 an optical signal outputting section that outputs and transmits the wavelength-multiplexed optical signal via a transmission line;
 wherein the contents information delivery system comprises local equipment having a first wavelength separating section that wavelength-separates the wavelength-multiplexed optical signal on the transmission line; and
 wherein each user station comprises a receiving section that receives an optical signal having the second wavelength assigned to one of the user stations from among wavelengths of the wavelength-multiplexed optical signal, which is wavelength-separated in the first wavelength separating section in the local equipment.

14. The contents information delivery system according to claim 13, wherein the local equipment on the transmission line is arranged at the user station side remotely from the central station.

15. The contents information delivery system according to claim 13, wherein said central station performs administration of subscriber information in each of the plurality of user stations upon receipt of control information from corresponding user station, and performs interruption/non-interruption control of the contents-included optical signal selected for each of at least one of the plurality of user stations based on the administration.

16. A central station in a contents information delivery system for delivering contents information from a plurality of contents sources to at least one of a plurality of user stations via the central station, the central station comprising:
 a receiving section that receives a plurality of contents-included optical signals each having a first wavelength different from each other, each said contents-included optical signal being transmitted from one of a plurality of contents sources;
 a generating section that generates a set of the received plurality of contents-included optical signals for each of the user stations;
 a selecting section that selects one of the plurality of contents-included optical signals from the set for each of at least one of the plurality of user stations, respectively, and performs interruption/non-interruption control of the contents-included optical signal selected for each of at least one of the plurality of user stations;
 a converting section that converts the first wavelength of the contents-included optical signal to be passed through thereof by the interruption/non-interruption control into a second wavelength assigned for each of the user stations, respectively;
 a multiplexing section that wavelength multiplexes the wavelength-converted contents-included optical signals; and
 an optical signal outputting section that outputs and transmits the wavelength-multiplexed optical signal via a transmission line, wherein
 each user station comprises a receiving section that receives an optical signal having the second wavelength assigned to one of the user stations from among wavelengths of the wavelength-multiplexed optical signal on the transmission line.

17. The central station according to claim 16, wherein said central station performs administration of subscriber information in each of the plurality of user stations upon receipt of control information from corresponding user station, and performs interruption/non-interruption control of the contents-included optical signal selected for each of at least one of the plurality of user stations based on the administration.

* * * * *